United States Patent
Saiki et al.

(10) Patent No.: US 7,724,318 B2
(45) Date of Patent: May 25, 2010

(54) ELECTRONIC EQUIPMENT WITH DISPLAY PANEL AND PROTECTIVE PLATE

(75) Inventors: Jun Saiki, Osaka (JP); Shuji Yamashita, Nara (JP)

(73) Assignee: Panasonic Corporation, Osaka (JP)

( * ) Notice: Subject to any disclaimer, the term of this patent is extended or adjusted under 35 U.S.C. 154(b) by 145 days.

(21) Appl. No.: 12/017,733

(22) Filed: Jan. 22, 2008

(65) Prior Publication Data
US 2008/0174714 A1    Jul. 24, 2008

(30) Foreign Application Priority Data
Jan. 22, 2007    (JP) .............................. 2007-011729

(51) Int. Cl.
*G02F 1/1333* (2006.01)
*G03B 17/00* (2006.01)

(52) U.S. Cl. .............................. 349/58; 349/59; 349/56; 396/421

(58) Field of Classification Search .................. 349/58, 349/56, 59; 396/421
See application file for complete search history.

(56) References Cited

U.S. PATENT DOCUMENTS
2001/0026689 A1* 10/2001 Ito ............................. 396/535
2002/0041764 A1* 4/2002 Tanaka ....................... 396/535
2005/0200737 A1* 9/2005 Shinohara et al. ...... 348/333.01
2007/0126946 A1* 6/2007 Tae et al. ...................... 349/58

FOREIGN PATENT DOCUMENTS

| JP | 2002-77677 | 3/2002 |
|----|------------|--------|
| JP | 2002-261456 | 9/2002 |
| JP | 2004-248101 | 9/2004 |
| JP | 2005-234143 | 9/2005 |

* cited by examiner

*Primary Examiner*—Mike Qi
(74) *Attorney, Agent, or Firm*—Hambre, Schumann, Mueller & Larson, P.C.

(57) ABSTRACT

Electronic equipment of the present invention having a display panel includes a protection plate that is opposed to an opposite surface of a display surface of the display panel and is substantially parallel to the opposite surface of the display surface of the display panel. According to this configuration, when a pressure is applied to the display panel from outside, the display panel can be suppressed from being deformed, whereby the strength of the display panel with respective to an external pressure can be enhanced.

7 Claims, 21 Drawing Sheets

ELECTRONIC EQUIPMENT WITH DISPLAY PANEL AND PROTECTIVE PLATE

BACKGROUND OF THE INVENTION

1. Field of the Invention

The present invention relates to electronic equipment with a display element such as a liquid crystal panel mounted thereon.

2. Description of Related Art

Recently, a display element such as a liquid crystal monitor capable of checking a photographing image is mounted on an image pickup apparatus such as a digital still camera.

FIG. 16 is an exploded perspective view of a conventional image pickup apparatus. As shown in FIG. 16, the conventional image pickup apparatus is composed of a body unit 100 and a rear unit 200. The body unit 100 includes an image pickup portion 101 in which a lens, an image pickup element, and the like are combined, and a printed board 102 with a signal processing microcomputer and the like mounted thereon. Furthermore, a metal sheet 101a, a flexible printed circuit 101b, a screw 101c, and the printed board 102 are placed on a rear surface side of the image pickup portion 101. An electric circuit unit (not shown) composed of a battery mounting portion, a power supply circuit, and the like is placed on an inner side of the printed board 102.

On the other hand, the rear unit 200 is fixed to the body unit 100 so as to cover the image pickup portion 101 and the printed board 102. Furthermore, the rear unit 200 includes an opening covered with a transparent plate made of a resin. Furthermore, a liquid crystal monitor 202 capable of displaying an image is provided on an inner surface (opposed to the image pickup portion 101) of the rear unit 200, and a display surface of the liquid crystal monitor 202 is placed so as to be checked visually from outside through the opening 201.

Thus, when the rear unit 200 is mounted on the body unit 100, a rear surface of the display surface of the liquid crystal monitor 202 is placed so as to be opposed to the image pickup portion 101 and the printed board 102. The arrangement configuration of the above-described liquid crystal monitor is disclosed, for example, by JP 2004-248101 A.

However, according to the configuration shown in FIG. 16, the rear surface of the image pickup portion 101 has a number of convex and concave portions, since the metal sheet 101a of the image pickup element, the flexible printed circuit 101b connecting the image pickup portion 101 to the printed board 102 electrically, the screw 101c for fixing the metal sheet 101a to a lens frame, and the like are placed. On the other hand, the rear surface (opposed to the body unit 100) of the liquid crystal monitor 202 is substantially flat. Thus, large gaps and small gaps are formed between the rear surface of the liquid crystal monitor 202 and the surface of the lens frame. In such a configuration, when a pressure is applied from outside to the display surface (outer surface of the rear unit 200) of the liquid crystal monitor 202, the liquid crystal monitor 202 is deformed. In particular, when a pressure is applied to a large gap portion between the rear surface of the liquid crystal monitor 202 and the surface of the lens frame, there is a possibility that the liquid crystal monitor 202 may be deformed enough to damage the liquid crystal monitor 202.

SUMMARY OF THE INVENTION

Therefore, with the foregoing in mind, it is an object of the present invention to provide electronic equipment capable of enhancing the strength of a display element with respect to an external pressure or external impact.

Electronic equipment of the present invention has a display panel, and includes a protection plate that is opposed to an opposite surface of a display surface of the display panel and is substantially parallel to the opposite surface of the display surface of the display panel.

According to the present invention, when a pressure is applied to a display element, the display element can be suppressed from being deformed, whereby the strength of the display element with respective to an external pressure or external impact can be enhanced.

Furthermore, due to the configuration in which the protection plate covers a part of the front surface of a display panel rear surface, and a support portion is provided separately in a region of the display panel rear surface not covered with the protection plate, the size of the protection plate can be decreased, and an electric circuit board placed side by side with the protection plate can be kept in a large size.

DETAILED DESCRIPTION OF THE INVENTION

Embodiment 1

In the present embodiment, an image pickup apparatus such as a digital still camera will be described as an example of the electronic equipment of the present invention.

[1. Configuration of an Image Pickup Apparatus]

Figure 1:
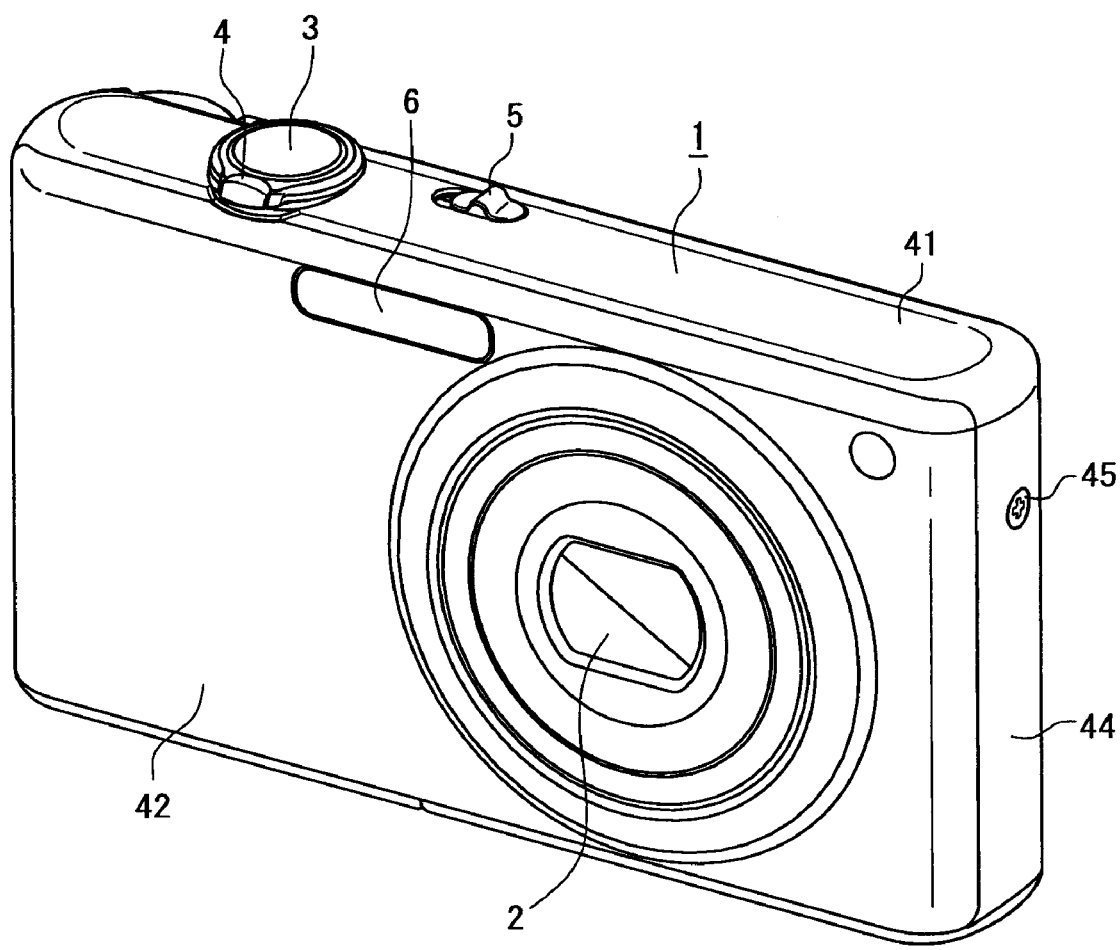
FIG. 1 is a perspective view showing an outer appearance of an image pickup apparatus of Embodiment 1.
Figure 2:
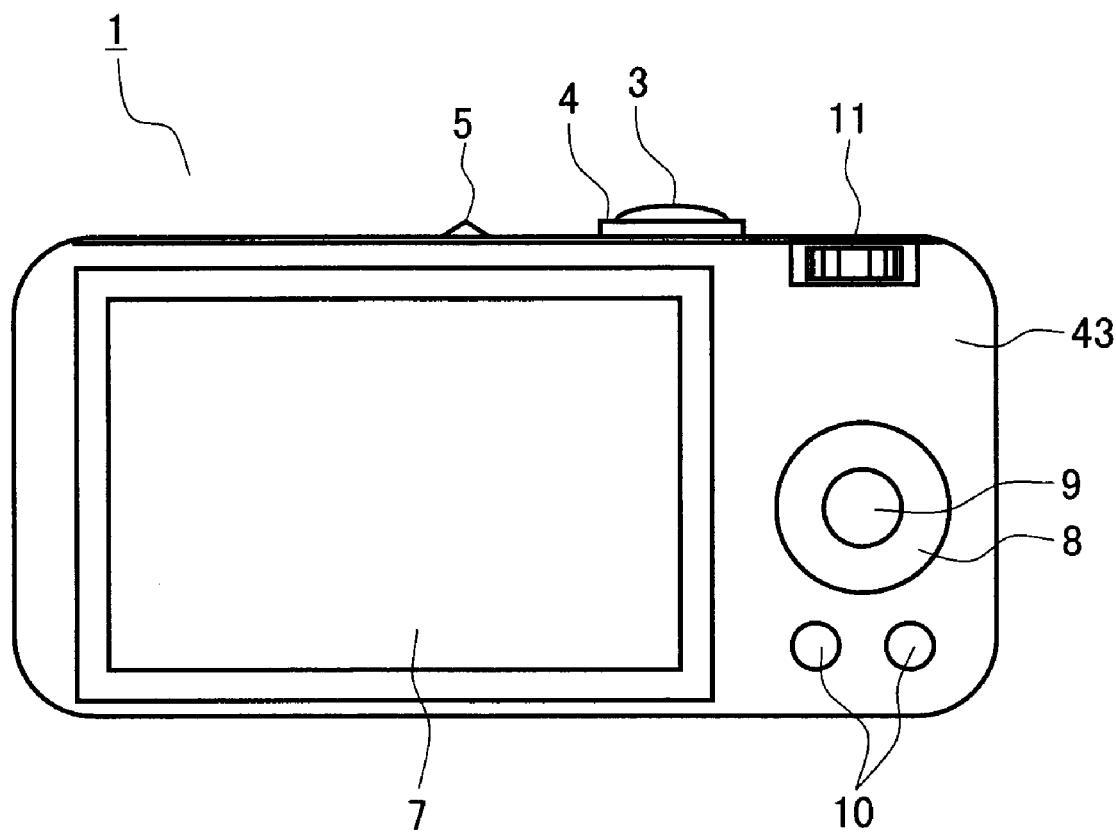
FIG. 2 is a front view of the image pickup apparatus.
Figure 3:
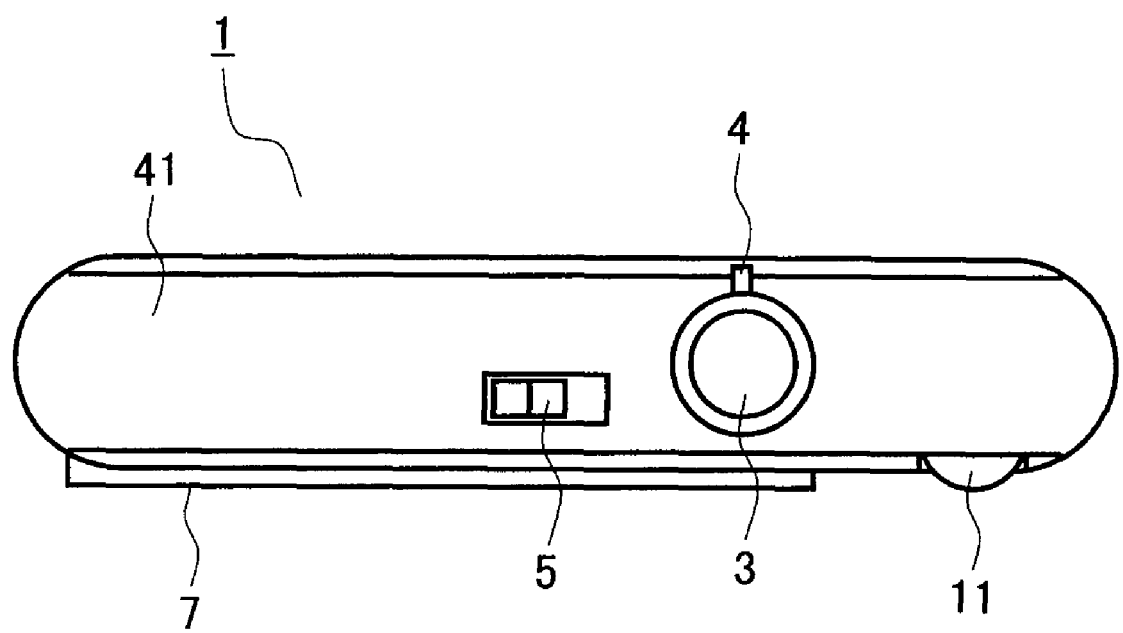
FIG. 3 is a top view of the image pickup apparatus.

FIG. 1 is a perspective view showing an outer appearance configuration of the image pickup apparatus. FIG. 2 is a rear view of the image pickup apparatus, showing a surface with a display portion mounted thereon (hereinafter, referred to as a rear surface). FIG. 3 is a top view of the image pickup apparatus, showing a surface with a release button and the like placed thereon (hereinafter, referred to as an upper surface).

As shown in FIGS. 1 to 3, an image pickup apparatus 1 includes a photographing portion 2, a release switch 3, a zoom switch 4, a power supply switch 5, a strobe 6, a display portion 7, a cursor key 8, a button 9, buttons 10, and a mode dial 11. The image pickup portion 2 and the strobe 6 are placed on a front surface of the image pickup apparatus 1. Furthermore, the release switch 3, the zoom switch 4, and the power supply switch 5 are placed on an upper surface of the image pickup apparatus 1. Furthermore, the display portion 7, the cursor key 8, the buttons 9 and 10, and the mode dial 11 are placed on a rear surface of the image pickup apparatus 1. The front surface and the rear surface are opposed to each other, and the front surface and the rear surface are substantially orthogonal to the upper surface.

As shown in FIG. 1, the image pickup portion 2 includes a lens portion composed of a focus lens, a zoom lens, and the like, and an image pickup element that captures an optical image incident through the lens portion and outputs an electric signal (video signal).

When pressed by a photographer, the release switch 3 can capture the electric signal captured by the image pickup element as a video signal.

The zoom switch 4 is placed substantially coaxially with the release switch 3 so as to rotate in a circumferential direction relative to the release switch 3. The zoom lens in the image pickup portion 2 is moved by rotating the zoom switch 4, and an optical image formed at the image pickup element can be zoomed in or zoomed out. A zoom operation includes not only an electronic zoom of zooming in or zooming out an image by signal processing but also an optical zoom of moving a zoom lens.

The power supply switch 5 is composed of a slide switch. When the power supply switch 5 is slid in one direction, a power supply is turned on. When the power supply switch 5 is slid in the other direction, the power supply is turned off.

The strobe 6 can flash simultaneously with the operation of the release button 3. The strobe 6 can be switched between the light emission and the non-light emission by arbitrary setting in the image pickup apparatus 1.

As shown in FIG. 2, the display portion 7 (display element) can display various kinds of pieces of information such as an image (through image) during photographing, a menu screen, a battery charge amount, a current date, and the number of photographable images. Although the display portion 7 is composed of a liquid crystal panel in the present embodiment, it may be composed of an organic EL display element or another display element. A method for fixing the display portion 7 to the image pickup apparatus 1 will be described in detail later. Furthermore, the display portion 7 and the image pickup portion 2 are placed on side surfaces opposed to each other in the image pickup apparatus 1.

The cursor key 8 can perform an instruction operation in up, down, right, and left directions. Each operation portion in up, down, left, and right directions is assigned a predetermined function. Examples of the functions assigned to each operation portion include the switching between the light emission and the non-light emission of the strobe 6, the on/off switching of a self-timer function, and the setting of bracket photographing (variable exposure photographing). When a menu screen is displayed on the display portion 7, a cursor displayed in a menu also may be moved in a desired direction.

The button 9 is placed at the center of the cursor key 8 and mainly can perform a "determination" operation of a command.

The buttons 10 can switch the display and the non-display of the above-described various kinds of pieces of information to be displayed on the display portion 7, for example, or can be assigned other various functions. Although two buttons 10 are used in the present embodiment, the number of the buttons 10 is not limited thereto.

The mode dial 11 is placed so as to rotate in the vicinity of the upper surface of the image pickup apparatus 1, and can set the functions of the image pickup apparatus 1. The functions that can be set include a "normal photographing mode" in which still images can be photographed, a "high-speed photographing mode" suitable for photographing a subject whose movement is fast, a "close-up mode" suitable for taking a close-in shot of a subject, a "reproduction mode" capable of displaying an image that is being recorded on an information medium on the display portion 7, and the like.

Furthermore, the image pickup apparatus 1 is cased mainly with an upper cover 41, a front cover 42 (second cover), a rear cover 43 (first cover), and side covers 44. One of the pair of side covers 44 is formed so as to also cover a part of the bottom surface as well as the side surface of the image pickup apparatus 1. Furthermore, a battery door (not shown) for closing a battery housing portion is placed on the bottom surface of the image pickup apparatus 1. Thus, the bottom surface of the image pickup apparatus 1 is covered with a part of the side cover 44 and the battery door. The outline of assembling each cover is as follows: the upper cover 41 is attached to the upper surface of a unit in which a camera unit 25 including a lens portion, an image pickup element, and a circuit is combined with an electric circuit unit 26, the front cover 42 is attached to the front surface (on which an objective lens is placed), the rear cover 43 is attached to the rear surface (opposed to the front surface), and the side covers 44 are attached to right and left side surfaces. During assembling, the upper cover 41, the front cover 42, and the side covers 44 are fastened together with a screw 45.

[2. Inner Configuration of the Image Pickup Apparatus 1]

[2-1. Entire Configuration]

Figure 4:
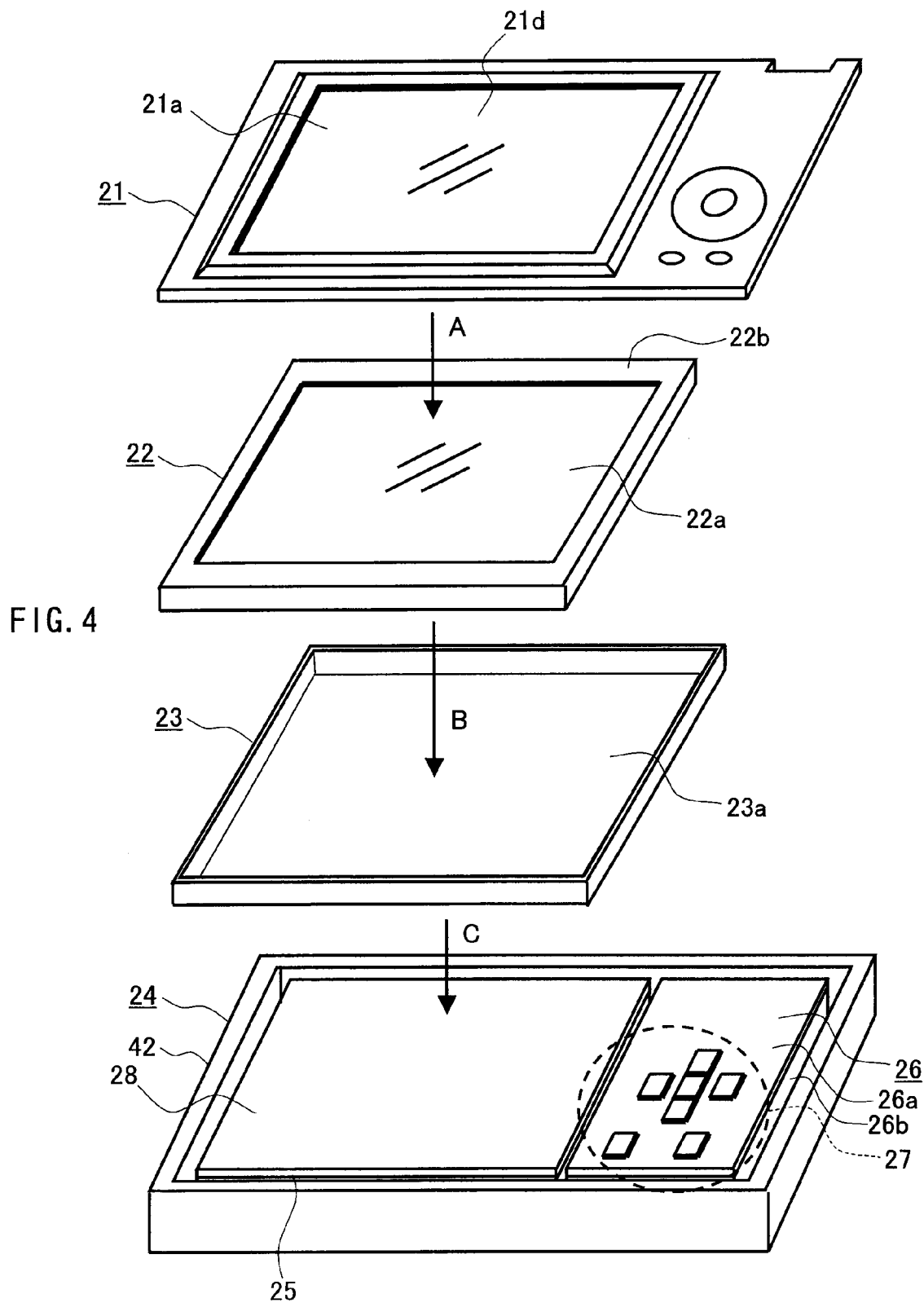
FIG. 4 is an exploded perspective view of the image pickup apparatus.

FIG. 4 is an exploded perspective view showing a schematic configuration of the image pickup apparatus 1. Each component and each unit shown in FIG. 4 are shown schematically without being drawn to scale for convenience of description.

In FIG. 4, a rear unit 21 covers a rear surface of the image pickup apparatus 1. Furthermore, the rear unit 21 is provided with the cursor key 8, the buttons 9 and 10, and the like. Furthermore, the principal surface of the rear unit 21 is provided with an opening 21a having a transparent plate 21d. The opening 21a has an opening area substantially equal to an effective display area of the display portion 7 (or a display unit 22).

The display unit 22 is composed of, for example, a liquid crystal display panel, and has a display area 22a on a principal surface. Furthermore, an elastic material 22b is fixed to an outer peripheral edge of the display panel.

The holding frame 23 is composed of, for example, a metal sheet, and has a housing portion 23a capable of housing at least the display unit 22.

A front unit 24 includes the front cover 42 (second cover) placed so as to cover the surface of the camera unit 25 on an objective lens side, the camera unit 25, and the electric circuit unit 26 with a signal processing microcomputer and the like mounted thereon. The camera unit 25 contains mainly the image pickup portion 2 described above. Furthermore, the surface of a lens frame (not shown) of the camera unit 25 is provided with a protection plate 28. The protection plate 28 is placed so as to cover almost an entire surface of the lens frame. Furthermore, the protection plate 28 is formed so that the surface thereof (opposed to the holding frame 23) is substantially flat. The electric circuit unit 26 includes a printed board 26a and a battery mounting portion 26b. A signal processing microcomputer and the like are mounted on the printed board 26a. The printed board 26a may be composed of two printed boards 26d and 26e placed substantially in parallel to each other as shown in FIG. 10E. Furthermore, the printed board 26a is provided with a switch 27. The battery mounting portion 26b is formed substantially in a box shape made of metal, and enables a chargeable battery such as a lithium ion battery to be attached therein or detached therefrom. The battery mounting portion 26b is fixed to the image pickup apparatus 1 with a screw made of metal. Furthermore, when the cursor key 8, and the buttons 9 and 10 are pressed by a user, the switch 27 is pressed by rear surfaces of the cursor key 8, and the buttons 9 and 10. More specifically, when the user operates the cursor key 8, and the buttons 9 and 10, each key or the like presses the switch 27, whereby an internal circuit is driven. The detailed description of the front unit 21 will be described later.

The image pickup apparatus 1 allows the display unit 22 held by the holding frame 23 to be housed in a case composed of the rear unit 21 and the front unit 24. After the display unit 22 is housed, the display area 22a of the display unit 22 is placed so as to overlap the opening 21a of the rear unit 21, and thus, a video and information displayed on the display area 22a can be checked visually from outside.

Next, the detailed configuration of each unit shown in FIG. 4 will be described.

[2-2. Configuration of the Display Unit 22]

Figure 5A:
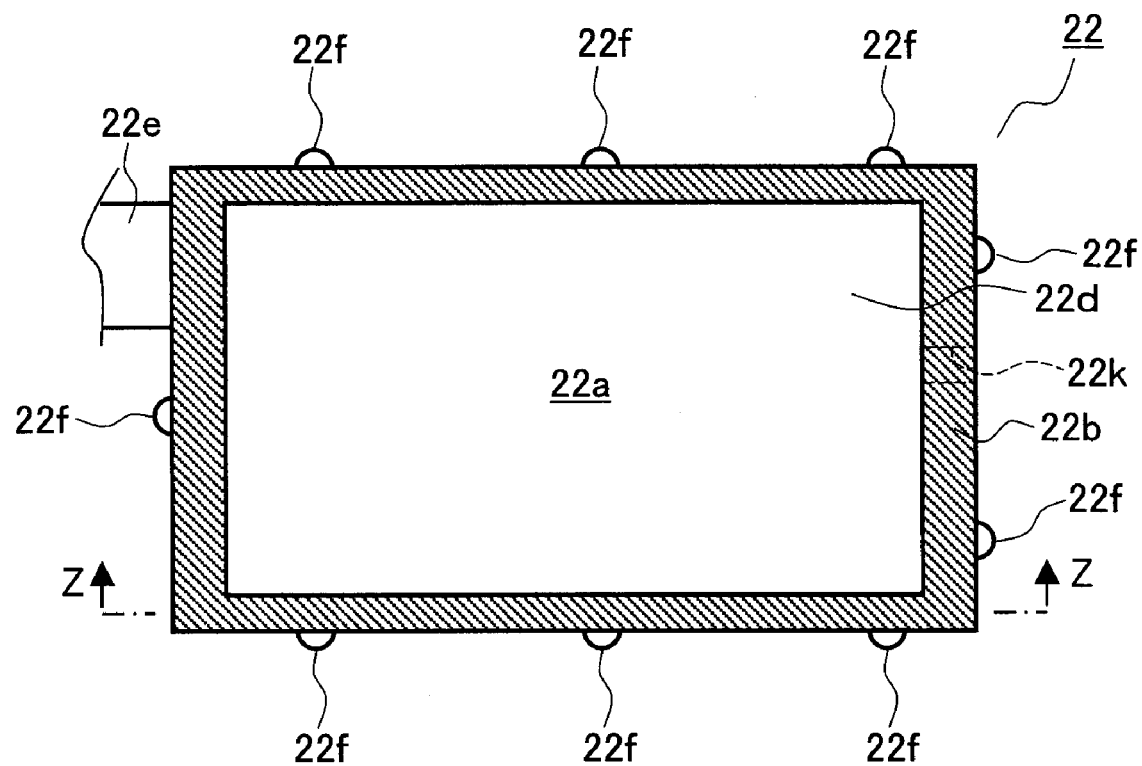
FIG. 5A is a plan view of a display unit.
Figure 5B:
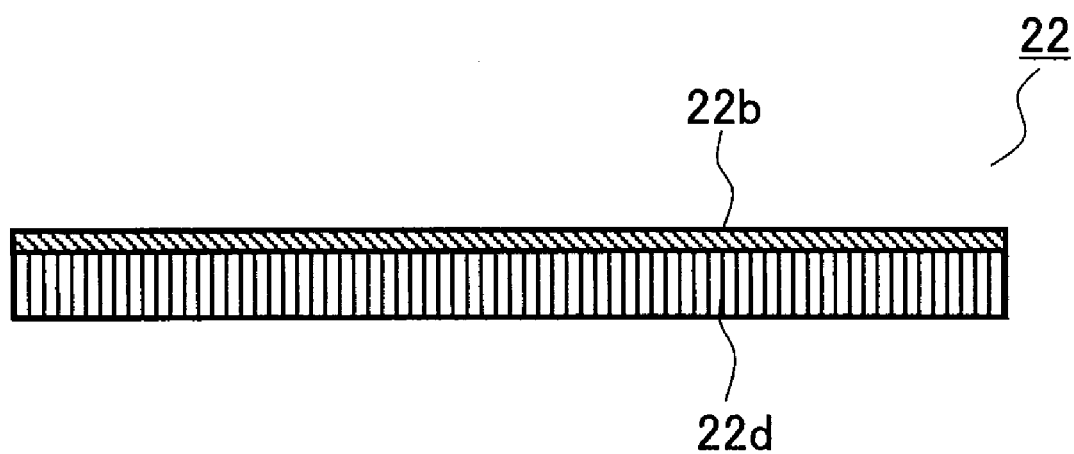
FIG. 5B is a cross-sectional view of the display unit.

FIG. 5A is a plan view showing a configuration of the display unit 22. FIG. 5B is a cross-sectional view taken along a line Z-Z in FIG. 5A.

As shown in FIGS. 5A and 5B, the display area 22a capable of displaying an image and various kinds of pieces of information is placed substantially at the center of the principal surface of the display panel 22d. A non-display area that cannot display an image and the like is present at an outer peripheral edge of the display panel 22d. The non-display area is provided with the elastic material 22b. The elastic material 22b is composed of a material that is deformed elastically.

The elastic material 22b is sandwiched between the display panel 22d and the rear unit 21 to be compressed when the display unit 22 is incorporated in the image pickup apparatus 1. This reduces the intrusion of foreign matter such as dust into the display area 22a. Furthermore, the elastic material 22b is attached to the display panel 22d with a double-sided tape, an adhesive, or the like.

Furthermore, flexible boards 22e electrically connected to other electric circuits are placed on a side end of the display panel 22d.

Furthermore, three dowels 22f are placed on each of upper and lower surfaces of the display panel 22d. Dowels 22f also are placed on side surfaces of the display panel 22d. The dowels 22f are fitted in holes 22h of the holding frame 23 described later, thereby allowing the holding frame 23 to hold the display unit 22.

Furthermore, an injection port 22k for injecting liquid crystal is formed in at least one portion on the outer peripheral edge of the display panel 22d. The liquid crystal panel is configured by injecting liquid crystal between two glass substrates via the injection port 22k, and sealing the injection port 22k after injection. The injection port 22k is sealed with a UV-curable adhesive or the like after the liquid crystal is injected and has a strength lower than that of the other sites, since it is formed by cutting away the glass substrates.

[2-3. Configuration of the Holding Frame 23]

Figure 6:
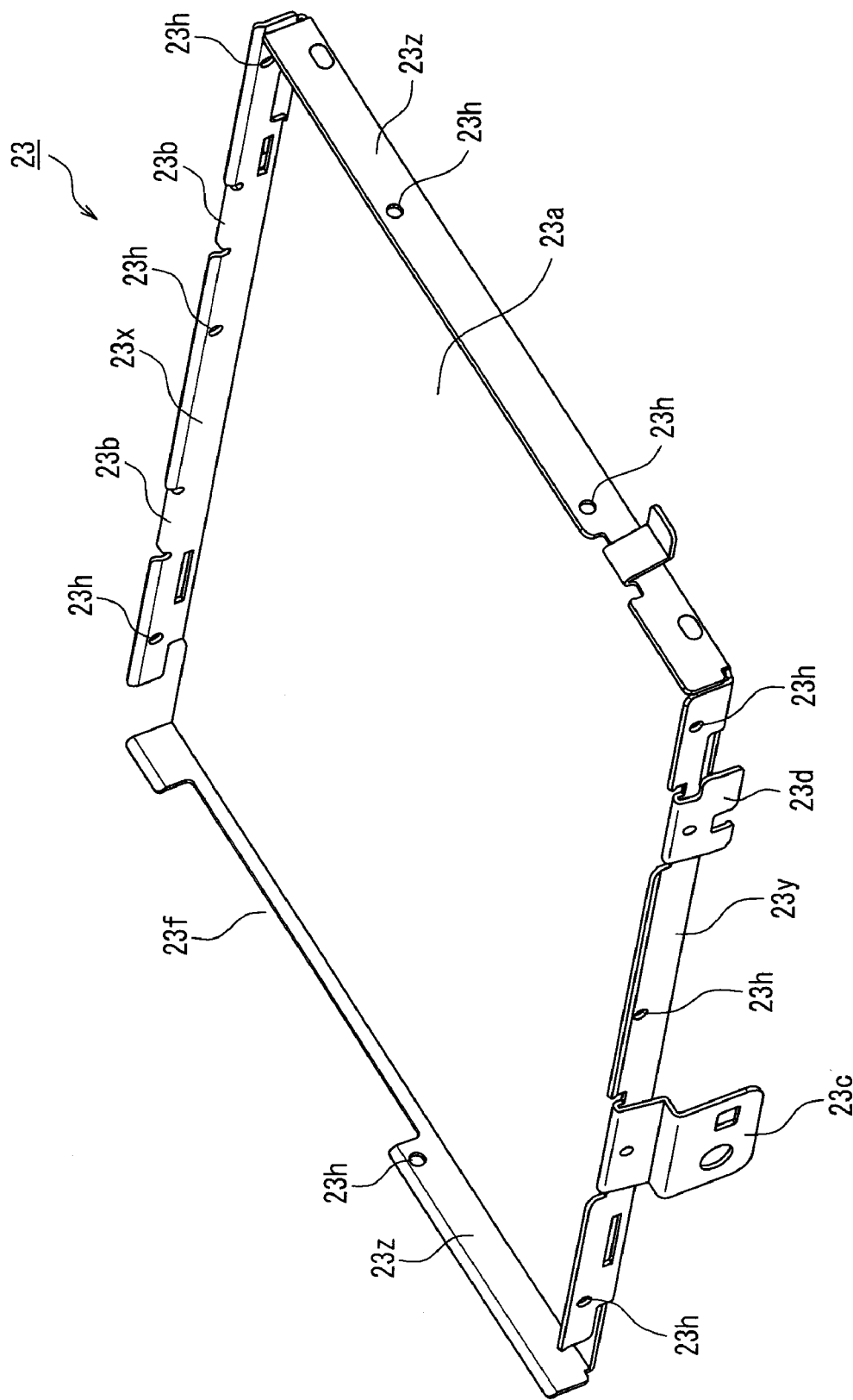
FIG. 6 is a perspective view of a holding frame.
Figure 7A:
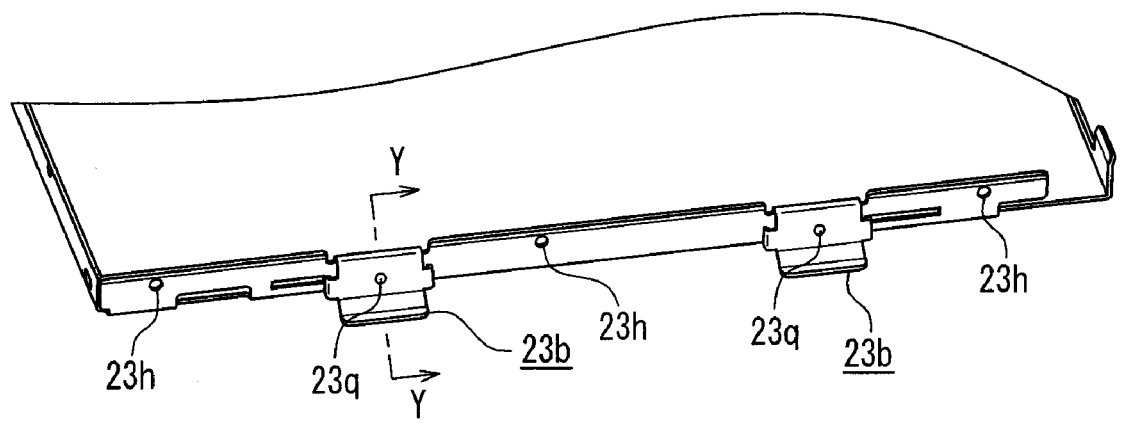
FIG. 7A is a perspective view of main portions on an upper surface side of the holding frame.
Figure 7B:
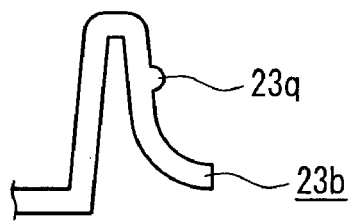
FIG. 7B is a cross-sectional view of main portions of the holding frame.
Figure 7C:
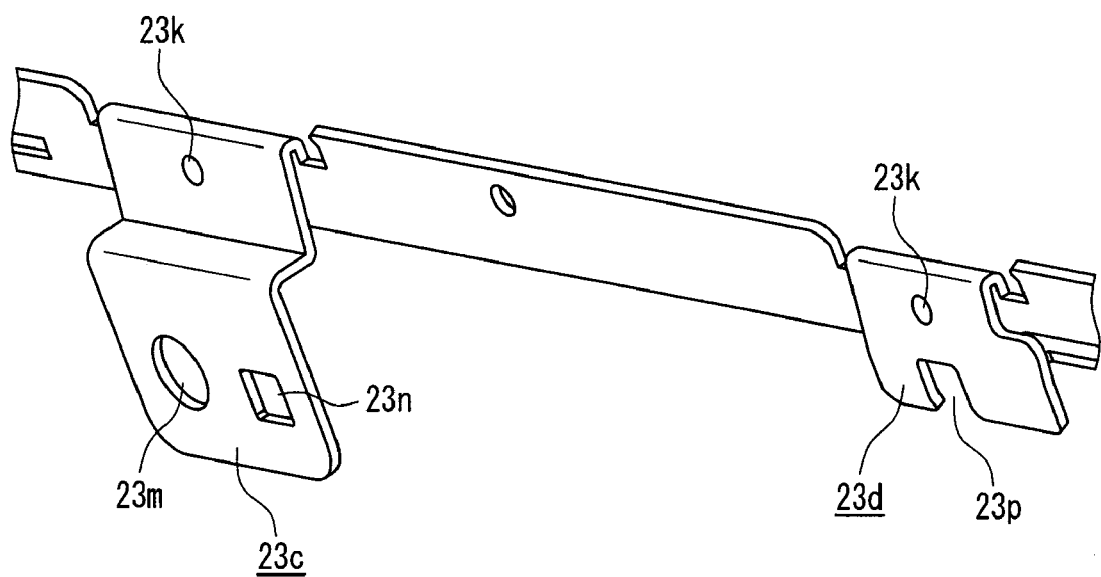
FIG. 7C is a perspective view of main portions on a bottom surface side of the holding frame.

FIG. 6 is a perspective view showing a configuration of the holding frame 23. FIG. 7A is a perspective view of main portions on an upper surface side of the holding frame 23. FIG. 7B is a cross-sectional view of main portions taken along a line Y-Y in FIG. 7A. FIG. 7C is a perspective view of main portions on a bottom surface side in the holding frame 23.

As shown in FIG. 6, the housing portion 23a has a bottom portion whose outer edge is surrounded by a vertical wall in four directions, and has a space capable of housing the display unit 22 (see FIG. 4). The vertical wall is composed of an upper wall 23x opposed to the upper surface of the display unit 22 to be housed in the housing portion 23a, a lower wall 23y opposed to the upper wall 23x and the bottom surface of the display unit 22, and a pair of side walls 23z opposed to both side surfaces of the display unit 22.

The upper wall 23x is provided with two positioning chips 23b (first elastic chips) and three engagement holes 23h. The lower wall 23y is provided with the elastic chips 23c (second elastic chips) and 23d, and three engagement holes 23h. The side walls 23z are provided with an opening 23f and engagement holes 23h.

The opening 23f is used for allowing the flexible boards 22e (see FIG. 5A) placed in the display panel 22 to be led out from the holding frame 23.

The positioning chips 23b are inserted in the engagement holes 21b (see FIG. 9C) provided in the rear unit 21 (FIG. 4), whereby the holding frame 23 holds the rear unit 21.

The three engagement holes 23h are placed at a predetermined interval in the upper wall 23x, and are engaged with dowels 22f placed on the upper side of the display unit 22 among the dowels 22f placed on the display unit 22. The display unit 22 can be held by the holding frame 23 when the engagement holes 23h are engaged with the dowels 22f.

Furthermore, the positioning chips 23b are provided with projections 23q, respectively. The projections 23q abut against an inner surface of the rear unit 21 when the holding frame 23 is held by the rear unit 21, whereby the holding frame 23 is positioned with respect to the rear unit 21. Although the projections 23q are formed by press forming in the present embodiment, they may be formed by another method. Furthermore, although the projections 23q have a semispherical shape, they may be formed in another shape such as a cone.

As shown in FIG. 7C, the elastic chip 23c is provided with a projection 23k, a hole 23m, and a concave portion 23n. Furthermore, the elastic chip 23d is provided with a projection 23k and a concave portion 23p.

The projection 23k abuts against the inner surface of the rear unit 21 when the holding frame 23 is held by the rear unit 21, thereby positioning the holding frame 23 with respect to the rear unit 21. Although the projection 23k is formed by press forming in the present embodiment, it may be formed by another method. Furthermore, although the projection 23k has a semispherical shape, it may be formed in another shape such as a cone.

The hole 23m allows a screw to be inserted therethrough when the holding frame 23 is fixed to the rear unit 21 with the screw.

Projections provided on an inner side of the rear unit 21 are fitted in the concave portions 23n and 23p, whereby the holding frame 23 is positioned with respect to the rear unit 21.

[2-4. Configuration of the Rear Unit 21]

Figure 9A:
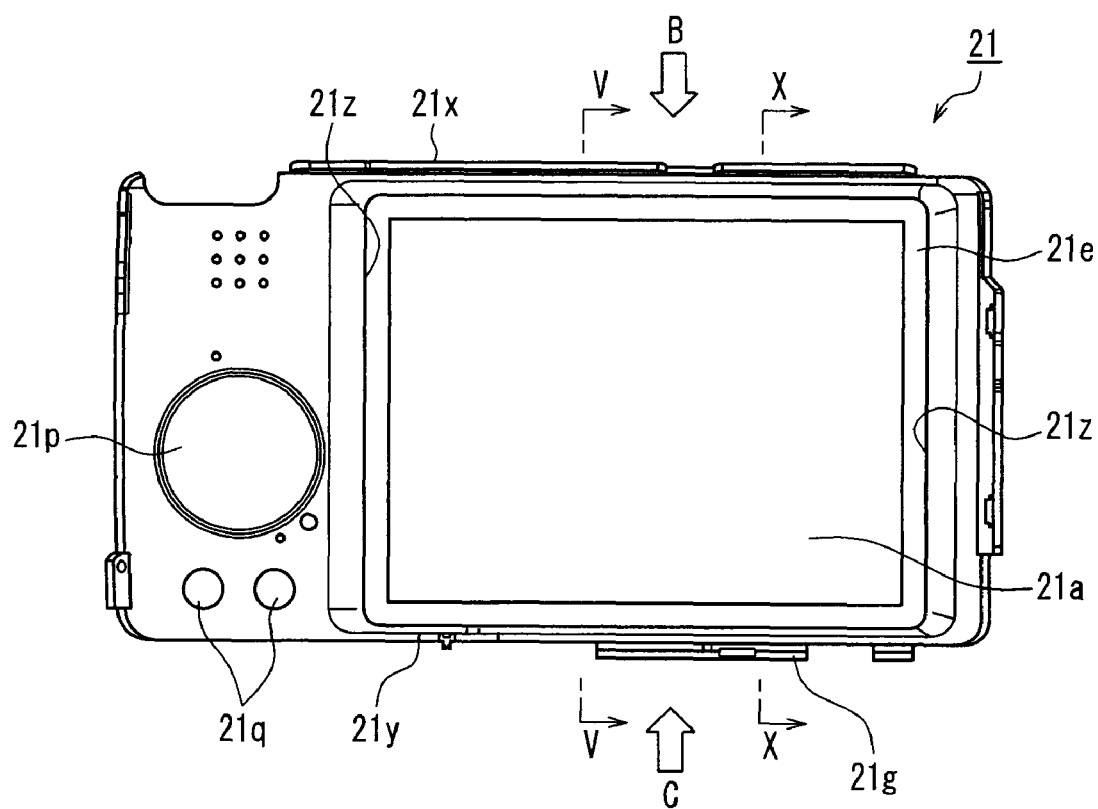
FIG. 9A is a front view showing an inner configuration of a rear unit.
Figure 9B:
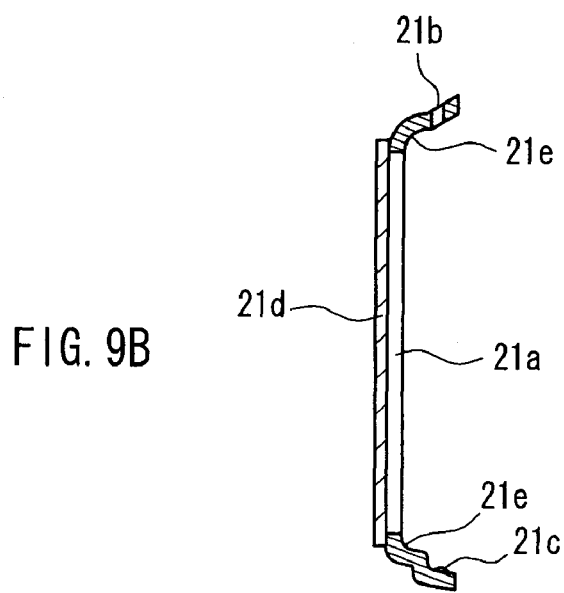
FIG. 9B is a cross-sectional view taken along a line X-X in FIG. 9A.
Figure 9C:
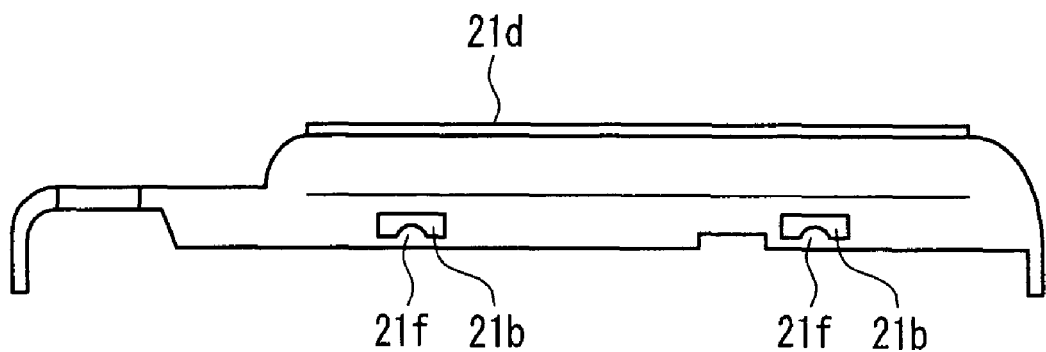
FIG. 9C is a plan view seen from an arrow B direction in FIG. 9A.
Figure 9D:
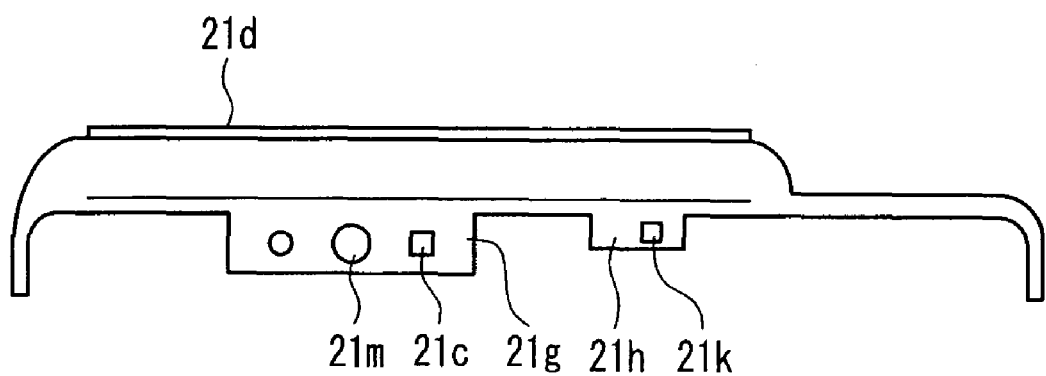
FIG. 9D is a plan view seen from an arrow C direction in FIG. 9A.

FIG. 9A is a plan view of the rear unit 21, showing an inside configuration. FIG. 9B is a cross-sectional view taken along a line X-X in FIG. 9A. FIG. 9C is a plan view seen from an arrow B direction in FIG. 9A and seen from an upper surface side of the image pickup apparatus 1. FIG. 9D is a plan view seen from an arrow C direction in FIG. 9A and seen from a bottom surface side of the image pickup apparatus 1.

In FIG. 9A, the rear unit 21 is provided with a concave portion capable of housing the display unit 22 and the like on an inner surface. The opening 21a is formed on a bottom surface of the concave portion. Furthermore, an abutting surface 21e is placed on the periphery of the opening 21a, against which the elastic material 22b abuts when the display unit 22 is housed in the concave portion. Furthermore, the periphery of the concave portion is surrounded by the upper wall 21x, the lower wall 21y, and the pair of side walls 21z. Furthermore, the transparent plate 21d (see FIG. 9B) is fixed so as to cover the opening 21a from outside. The transparent plate 21d is composed of an acrylic plate or the like, and is placed for the purpose of protecting the display area 22a of the display unit 22 from damage, shock, and the like.

Furthermore, an opening 21p for accepting the cursor key 8 and the button 9 so that they are exposed to a surface side of the rear unit 21 and openings 21q for accepting the buttons 10 so that they are exposed to the surface side of the rear unit 21 are formed on the side of the concave portion.

As shown in FIGS. 9A and 9C, the upper wall 21x is provided with two engagement holes 21b. The positioning chips 23b of the holding frame 23 are engaged with the respective engagement holes 21b. Furthermore, a projection 21f is formed in each engagement hole 21b. The projections 21f abut against the surface of the positioning chips 23b when the positioning chips 23b are engaged with the engagement holes 21b, whereby positioning is performed. This enables the upper portion of the holding frame 23 to be positioned with respect to the upper portion of the rear unit 21.

As shown in FIGS. 9B and 9D, the lower wall 21y is provided with ribs 21g and 21h. The rib 21g is provided with a projection 21c and a hole 21m. Furthermore, the rib 21h is provided with a projection 21k.

The projection 21c is configured so as to be fitted in the concave portion 23n formed in the elastic chip 23c of the holding frame 23. The projection 21k is configured so as to be fitted in the concave portion 23p formed in the elastic chip 23d. The projection 21c is fitted in the concave portion 23n, and the projection 21k is fitted in the concave portion 23p, whereby the lower portion of the holding frame 23 can be positioned with respect to the rear unit 21.

The hole 21m allows a screw to be inserted therethrough when the rear unit 21 is fixed with the screw.

[2-5. Configuration of the Front Unit 24]

Figure 10A:
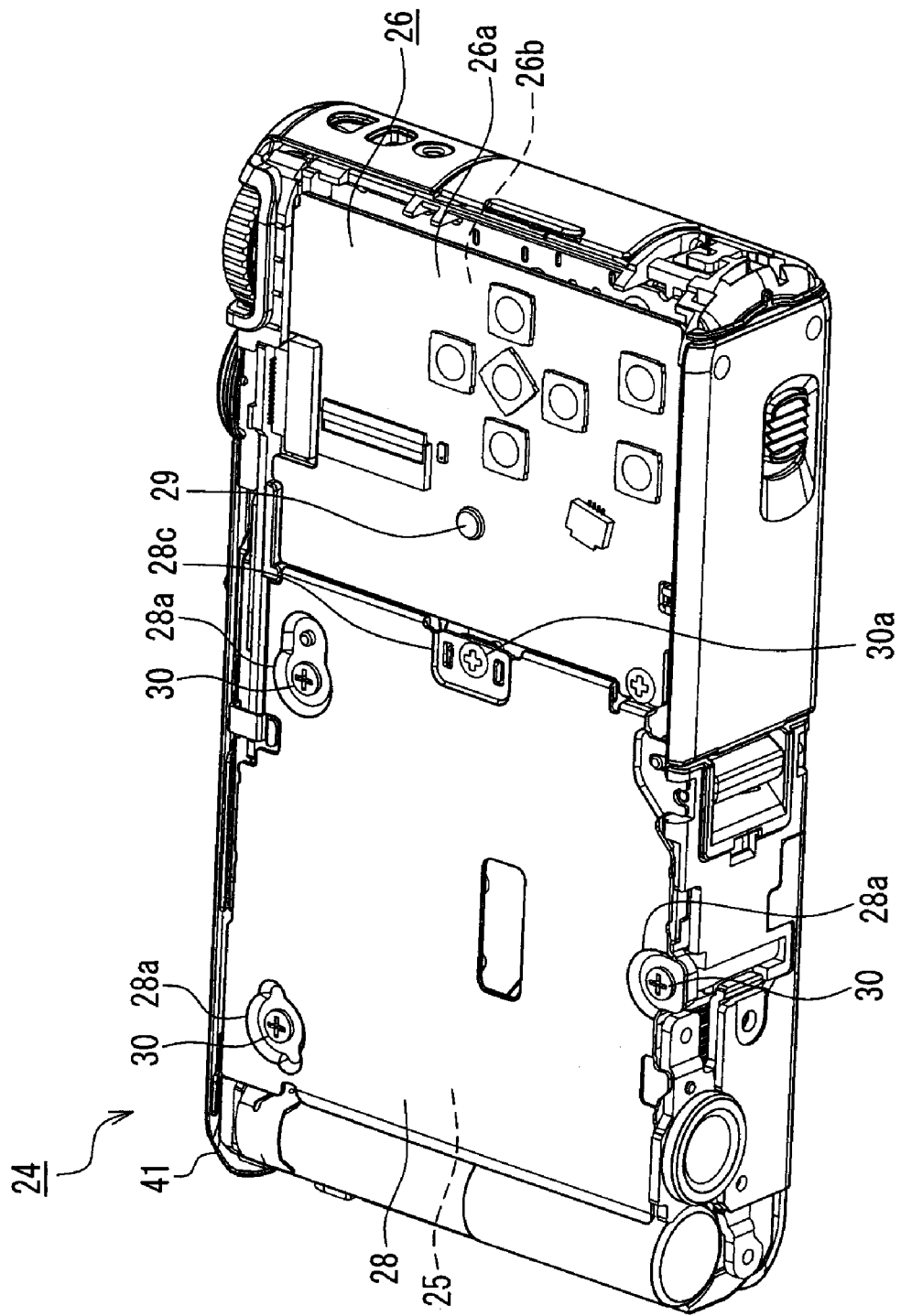
FIG. 10A is a perspective view showing a configuration of a front unit.
Figure 10B:
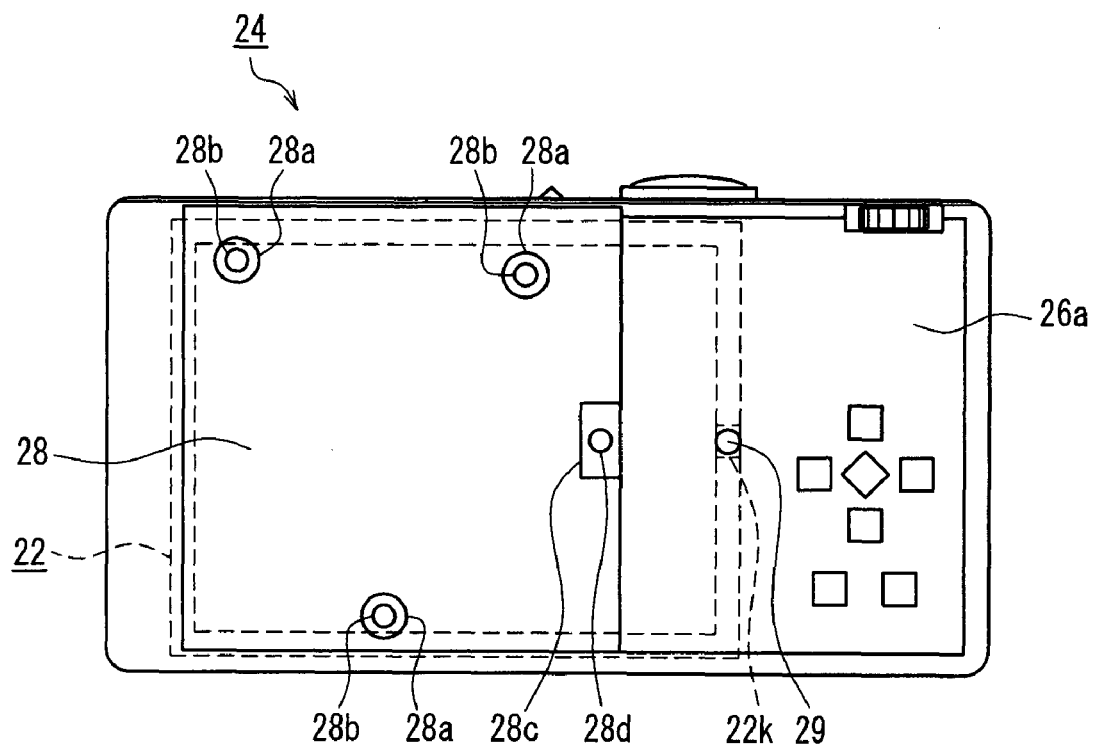
FIG. 10B is a plan view showing a configuration of the front unit.
Figure 10C:
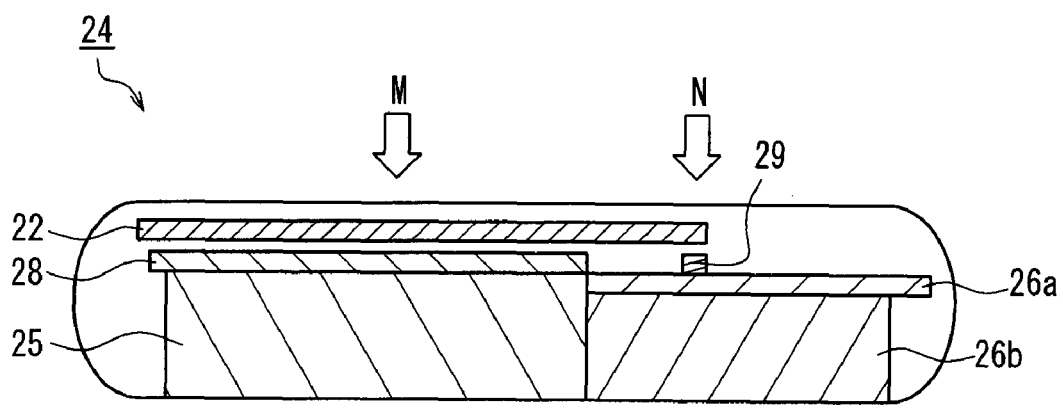
FIG. 10C is a side view showing a configuration of the front unit.
Figure 10D:
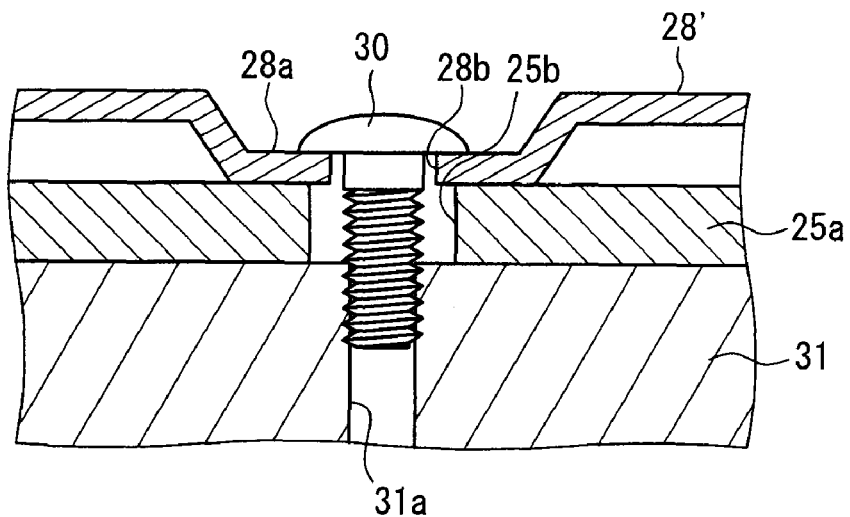
FIG. 10D is a cross-sectional view showing a configuration on the periphery of a screw hole in the front unit.
Figure 10E:
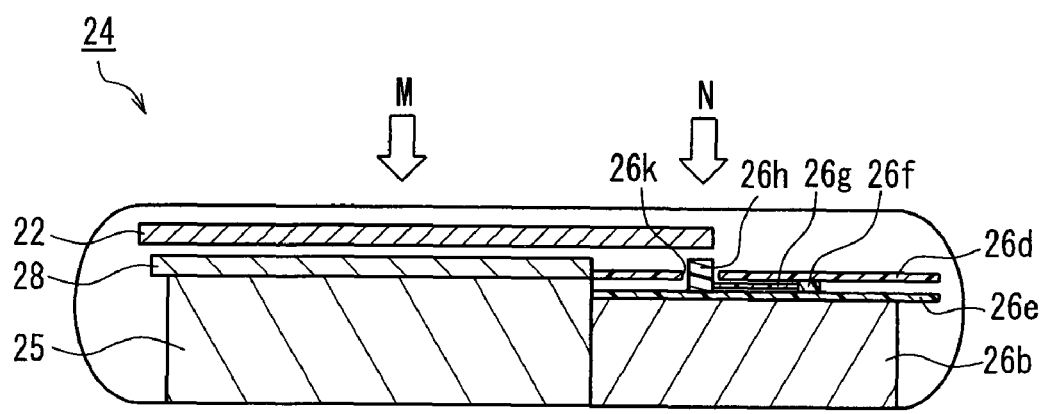
FIG. 10E is a side view showing a configuration of another example of the front unit.

FIG. 10A is a perspective view showing a configuration of the front unit 24. FIG. 10B is a plan view showing a configuration of the front unit 24. FIG. 10C is a view seen from a bottom surface side of the front unit 24, schematically showing an internal configuration. FIG. 10D is a cross-sectional view of main portions in the vicinity of a screw 30. The description of the components in FIG. 10A that have been described with reference to FIG. 4 will be omitted. In FIG. 10B, the configurations of components whose descriptions are not necessary are omitted. In FIG. 10C, in order to show each configuration placed in the front unit 24 clearly, region hatchings are provided.

As shown in FIGS. 10A to 10C, the front unit 24 includes the camera unit 25, the electric circuit unit 26, the protection plate 28, a protrusion 29, and the screws 30.

The protection plate 28 is formed of a conductive material such as a metal sheet. The protection plate 28 is fixed to the surface of a lens frame 25a (see FIG. 10D) of the camera unit 25 with the screws 30. The protection plate 28 has a size capable of covering almost an entire surface of the lens frame 25a. The protection plate 28 is placed side by side with the printed board 26a. As shown in FIG. 10E, in the case of a configuration having the two printed boards 26d and 26e, the printed board 26d and the printed board 26e can be connected to each other via a connector (not shown). As shown in FIG. 10C, the principal surface (opposed to the display panel 22) of the protection plate 28 and the principal surface (opposed to the display panel 22) of the printed board 26a have different heights, and the principal surface of the protection plate 28 is placed further on the display panel 22 side. In the present embodiment, the principal surface of the protection plate 28 and the rear surface of the holding frame 23 holding the display unit 22 are opposed to each other with a minute gap. Furthermore, the protection plate 28 is provided with three concave portions 28a, and a hole 28b enabling the screw 30 to be inserted therethrough is formed in each concave portion 28a. The depth of the concave portion 28a is designed so that the top portion of the screw 30 is not higher than the principal surface of the protection plate 28 when at least the screw 30 is tightened. Furthermore, the protection plate 28 is provided with a concave portion 28c at an end on the printed board 26a side, and a hole 28d enabling a screw 30a to be inserted therethrough is formed in the concave portion 28c. A screw hole formed in the battery mounting portion 26b is placed below the hole 28d. Thus, the screw 30a can be screwed in the screw hole of the battery mounting portion 26b through the hole 28d.

The protrusion 29 is provided so as to protrude from the surface of the battery mounting portion 26b, and protrudes to the rear unit 24 side through the hole formed in the printed board 26a. As shown in FIG. 10C, the projection 29 is formed so that a top portion thereof has a height substantially the same as that of the principal surface of the protection plate 28. Furthermore, as shown in FIG. 10B, the protrusion 29 is formed at a position opposed to the injection port 22k formed in the display panel 22 or in the vicinity thereof when the rear unit 24 holding the display panel 22 is mounted on the front unit 21. Consequently, when an external pressure or external impact is applied in an arrow N direction in the vicinity of the injection port 22k of the display panel 22, a site in the vicinity of the injection port 22k abuts against the top portion of the projection 29, whereby the deformation of the display panel 22 can be suppressed. The position where the projection 29 is formed in FIGS. 10A-10C is an example, and the projection may be formed at a position at least opposed to the injection port 22k of the display panel 22, or at another position where the strength is insufficient.

A configuration as shown in FIG. 10E may be adopted. In the configuration shown in FIG. 10E, a projection 26h is formed integrally with a spacer 26f for positioning the two printed boards 26d and 26e, placed substantially in parallel with each other, with a gap of a predetermined size. According to this configuration, the projection 26h protrudes to the display panel 22 side through the hole 26k formed in the printed board 26d. Such a configuration can reduce a component count, and enables the spacer 26f and the projection 26h to be formed integrally, so that the production man-hour can be reduced. Although the projection 26h is connected to the spacer 26f via a rib 26g in the configuration shown in FIG. 10E, the rib 26g is not necessary. Furthermore, the spacer 26f, and a connector for connecting the printed boards 26d and 26e or a connector protecting member may be formed integrally.

The lens frame 25a shown in FIG. 10D is a partial constituent element of the camera unit 25, and is a member holding an image pickup element, a frame holding a lens, and the like. The lens frame 25a is formed substantially in a plate shape, and the image pickup element is held substantially at the center of the surface thereof. A fixing frame in a substantially cylindrical shape is held on the above-mentioned surface, and a moving frame capable of holding a lens such as an objective lens and moving it in an optical axis direction is held on an inner side of the fixing frame. Furthermore, the rear surface (opposed to the display panel 22) of the lens frame 25a is provided with a flexible printed board connecting electric elements such as an actuator moving a lens and an image pickup element, to a signal processing microcomputer mounted on the printed board 26a, a metal plate protecting the image pickup element from unwanted radiation, a screw fixing the metal plate to the lens frame 25a, and the like, and has a number of convex and concave portions.

The screw 30 is inserted through the hole 28b of the protection plate 28 and the hole 25b of the lens frame 25a, and screwed in a screw hole 31a of a frame 31. This enables the frame 31 to hold the protection plate 28 and the lens frame 25a. In the present embodiment, the protection plate 28 is placed between the head of the screw 30 and the lens frame 25a, and the inner diameter of the hole 25b of the lens frame 25a and the inner diameter of the hole formed in the protection plate 28 are set substantially larger than the outer diameter of a male screw portion of the screw 30. Therefore, when the screw 30 is tightened, the tightening torque is not transmitted to the lens frame 25a directly.

Furthermore, the screw 30a is inserted through the hole 28d formed in the protection plate 28, and screwed in a screw hole (not shown) formed in the battery mounting portion 26b. The screw 30a, the protection plate 28, and the battery mounting portion 26b are made of metal, respectively. Therefore, the protection plate 28 can be grounded electrically to a housing of the image pickup apparatus 1 via the screw 30a and the battery mounting portion 26b. Thus, unwanted radiation with respect to the image pickup element can be prevented, and the static electricity with which the protection plate 28 is charged can be dissipated to the outside.

A high positional precision is required of the lens frame 25a since it holds optical components such as the image pickup element and the lens as described above. Thus, when the tightening torque is transmitted to the lens frame 25a directly during fastening with the screw 30, the lens frame 25a is distorted, which decreases the optical positional precision. Then, the protection plate 28 is placed between the head of the screw 30 and the lens frame 25a, and the inner diameters of the holes 25b and 28b are set to be sufficiently larger than the outer diameter of the male screw of the screw 30 as in the present embodiment, whereby the tightening torque can be prevented from being transmitted to the lens frame 25a directly during fastening with the screw 30, and the lens frame 25a can be prevented from being distorted.

When the rear unit 21 holding the display panel 22 is mounted on the front unit 24 configured as described above, the display panel 22 is placed at a position shown in FIGS. 10B and 10C. More specifically, the display panel 22 is placed so as to overlap the protection plate 28 and the printed board 26a on a projected plane. Furthermore, the injection port 22k of the display panel 22 is placed so as to overlap the projection 29.

The rear surface of the display panel 22 abuts against the surface of the protection plate 28 when an external pressure or external impact is applied to the display panel 22 thus placed at a position (in the display area 22a of the display panel 22) and in a direction represented by an arrow M in FIG. 10C, whereby the display panel 22 can be prevented from being deformed further.

Furthermore, when an external pressure or external impact is applied to the display panel 22 at a position (where the injection port 22k is formed) and in a direction represented by the arrow N in FIG. 10C, the edge of the display panel 22 is deformed in the arrow N direction. However, the rear surface of the injection port 22k of the display panel 22 abuts against the surface of the projection 29 when the edge of the display panel 22 is deformed slightly, whereby the display panel 22 can be prevented from being deformed further.

The protection plate 28 is provided so as to prevent the deformation of the display panel 22. Therefore, it is preferred that the protection plate 28 is formed in the same area as or a larger area than that of the display panel 22 seen at an angle shown in FIG. 10B. However, in the recent image pickup apparatus, the apparatus body is being miniaturized, the display panel 22 is increasing in size, and a microchip to be mounted on the printed board 26a is enlarging along with the increase in functions of the image pickup apparatus, and hence, the protection plate 28 cannot be enlarged. For example, it is conceivable that the protection plate 28 is enlarged so that a part of the protection plate 28 overlaps the printed board 26a; however, this results in an increase in thickness of the apparatus body.

According to the present embodiment, the projection 29 is provided so as to protrude in a region of the printed board 26a, whereby the display panel 22 is prevented from being deformed largely when an external pressure or external impact is applied to a portion where the protection plate 28 is not present, while the protection plate 28 is provided in a limited space so as to prevent the deformation of the display panel 22.

In particular, although the vicinity of the injection port 22k is sealed with an adhesive in the display panel 22, it has low durability with respect to an external pressure or external impact since the vicinity of the injection port 22k is a portion obtained by cutting away the glass substrates. Thus, when an external pressure or external impact is applied in the arrow N direction in FIG. 10C, the display panel 22 is likely to be deformed in the arrow N direction. In the present embodiment, the projection 29 is formed at a position corresponding to the injection port 22k, whereby the display panel 22 is prevented from being deformed largely when an external pressure or external impact is applied at a position and in a direction represented by the arrow N.

[3. Assembling Method of an Image Pickup Apparatus]

The image pickup apparatus of the present embodiment is assembled as shown in FIG. 4. First, the display unit 22 is attached to the holding frame 23 as represented by an arrow B. Next, as represented by an arrow A, the rear unit 21 is attached to the holding frame 23. Then, as represented by an arrow C, the rear unit 21 with the display unit 22 and the holding frame 23 attached thereto is attached to the front unit 24. Consequently, the image pickup apparatus 1 is completed. Hereinafter, the incorporating operation for each unit will be described in detail.

[3-1. Method for Attaching the Display Unit 22 to the Holding Frame 23]

When the display unit 22 is attached to the holding frame 23, as shown in FIG. 5A, dowels 22f formed at the display unit 22 are engaged with the engagement holes 23h formed in the holding frame 23 shown in FIG. 6, whereby the display unit 22 is housed in the housing portion 23a.

At this time, the display unit 22 is housed in the housing portion 23a in such a manner that the flexible boards 22e placed at the display unit 22 can be led out of the holding frame 23 through the opening 23f.

Figure 8:
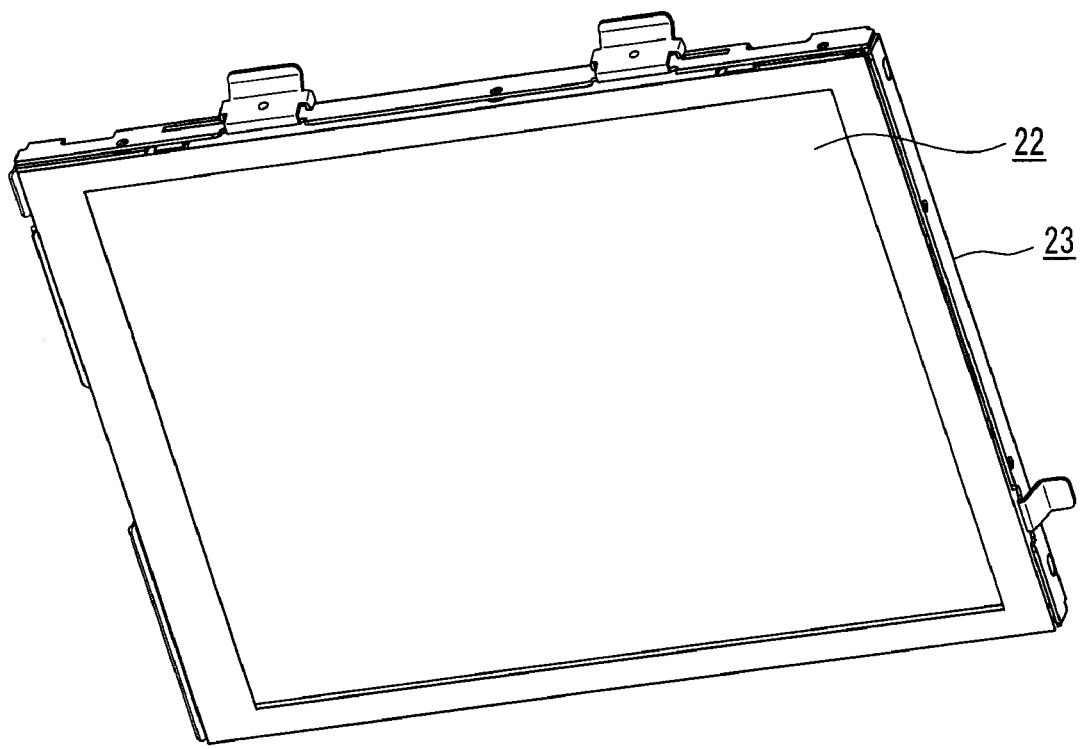
FIG. 8 is a perspective view showing a configuration of the display unit held by the holding frame.

FIG. 8 shows a state in which the display unit 22 is connected to the holding frame 23.

[3-2. Method of Attaching the Rear Unit 21 to the Holding Frame 23]

Figure 11:
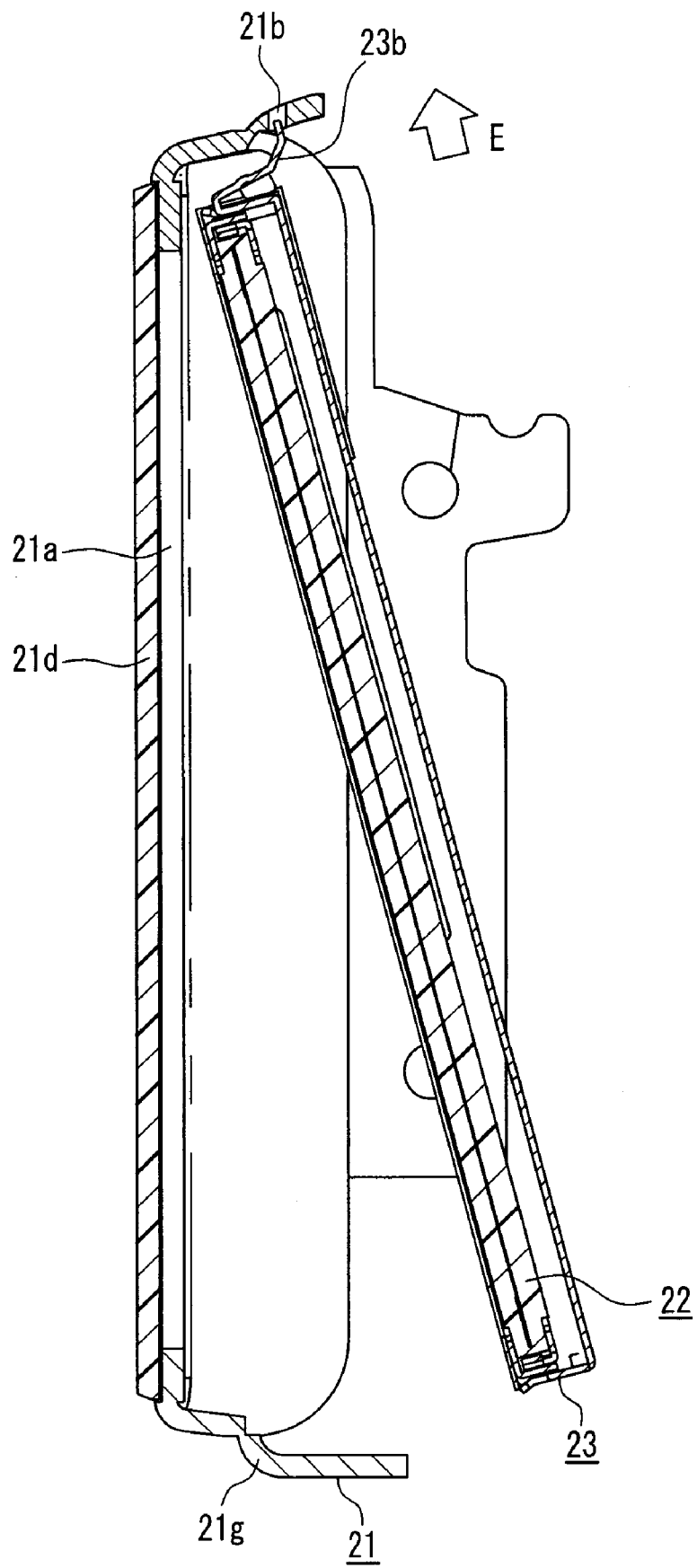
FIG. 11 is a cross-sectional view illustrating an operation in which the holding frame is attached to the rear unit.
Figure 12:
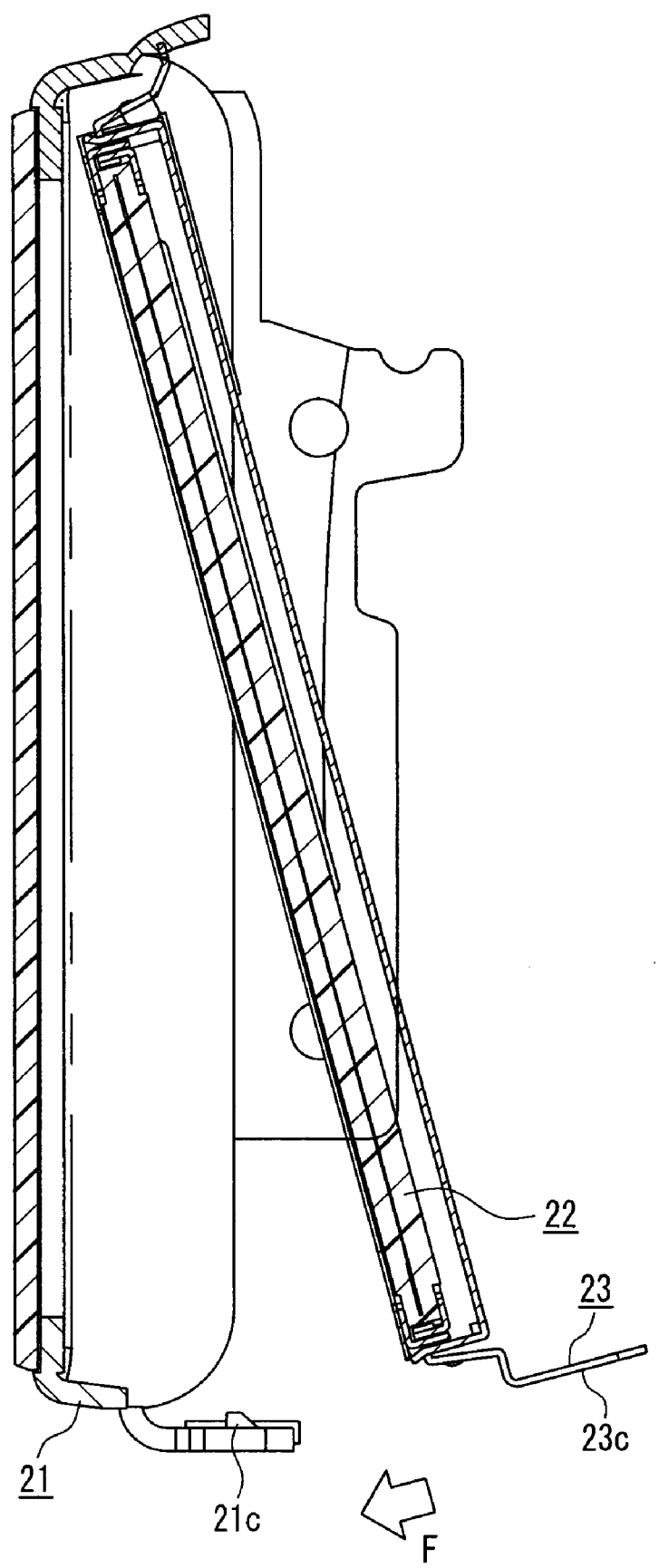
FIG. 12 is a cross-sectional view illustrating an operation in which the holding frame is attached to the rear unit.
Figure 13:
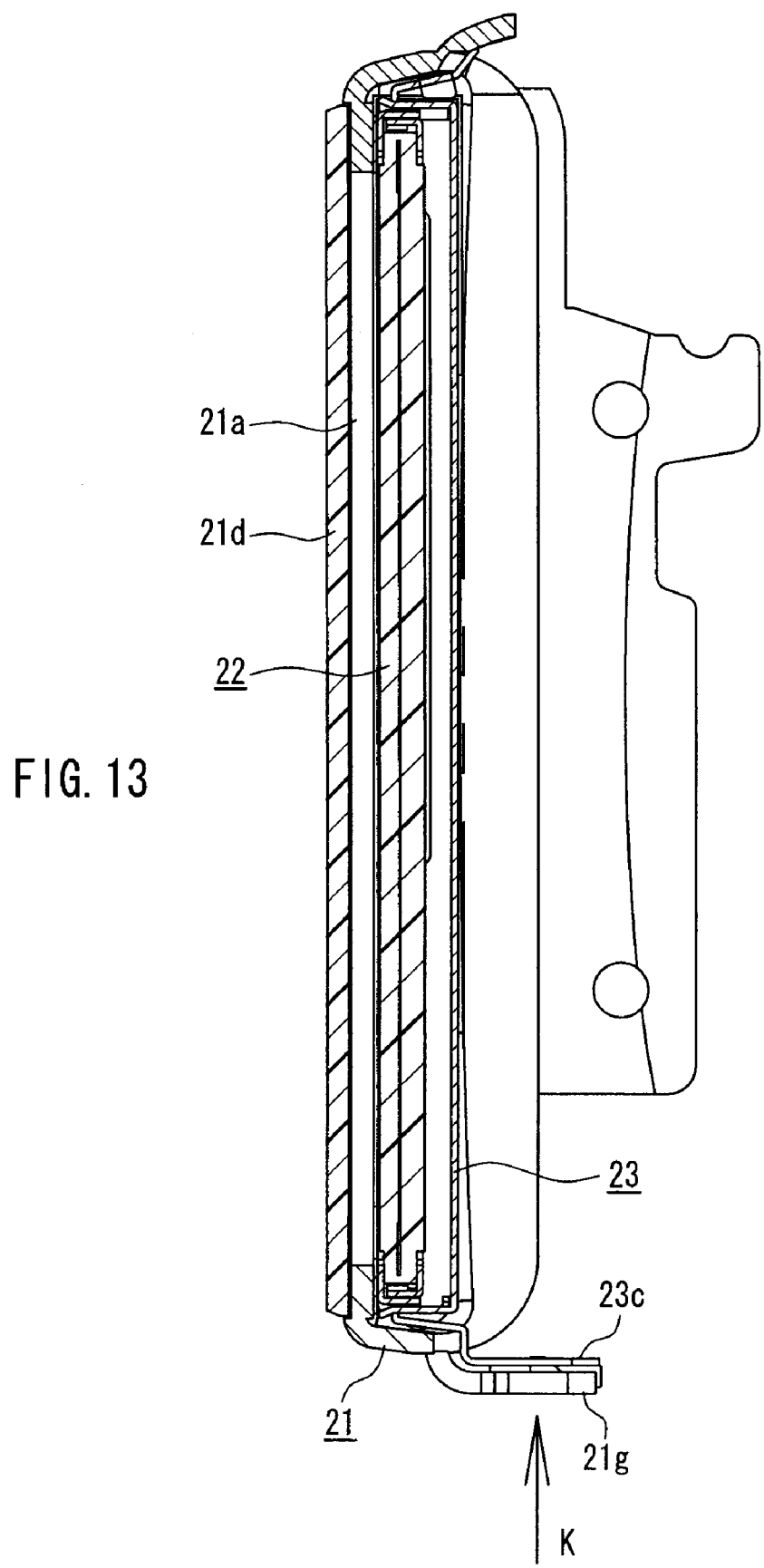
FIG. 13 is a cross-sectional view illustrating an operation in which the holding frame is attached to the rear unit.

The holding frame 23 with the display unit 22 attached thereto shown in FIG. 8 is attached to the rear unit 21 in the procedure shown in FIGS. 11 to 13. FIG. 11 shows a cross-section taken along the line X-X in FIG. 9A, and FIGS. 12 and 13 show a cross-section taken along a line V-V in FIG. 9A.

First, as shown in FIG. 11, the holding frame 23 is moved in an arrow E direction, whereby the positioning chip 23b formed in an upper portion of the holding frame 23 is engaged with the engagement hole 21b formed in the rear unit 21. At this time, the positioning chip 23b is held by the engagement hole 21b while being supported by the projection 21f formed in the engagement hole 21b.

Next, as shown in FIG. 12, the holding frame 23 is moved in an arrow F direction, whereby a lower portion of the holding frame 23 is housed in the rear unit 21. At this time, as shown in FIG. 7C, the projections 23k formed at the elastic chips 23c and 23d respectively abut against an inner surface of the rear unit 21 while deforming the elastic chip 23c elastically. Furthermore, the projection 21c formed at the rib 21g of the rear unit 21 is engaged with the concave portion 23n formed at the holding frame 23. Furthermore, the projection 21k formed at the rib 21h is engaged with the concave portion 23p.

Figure 14:
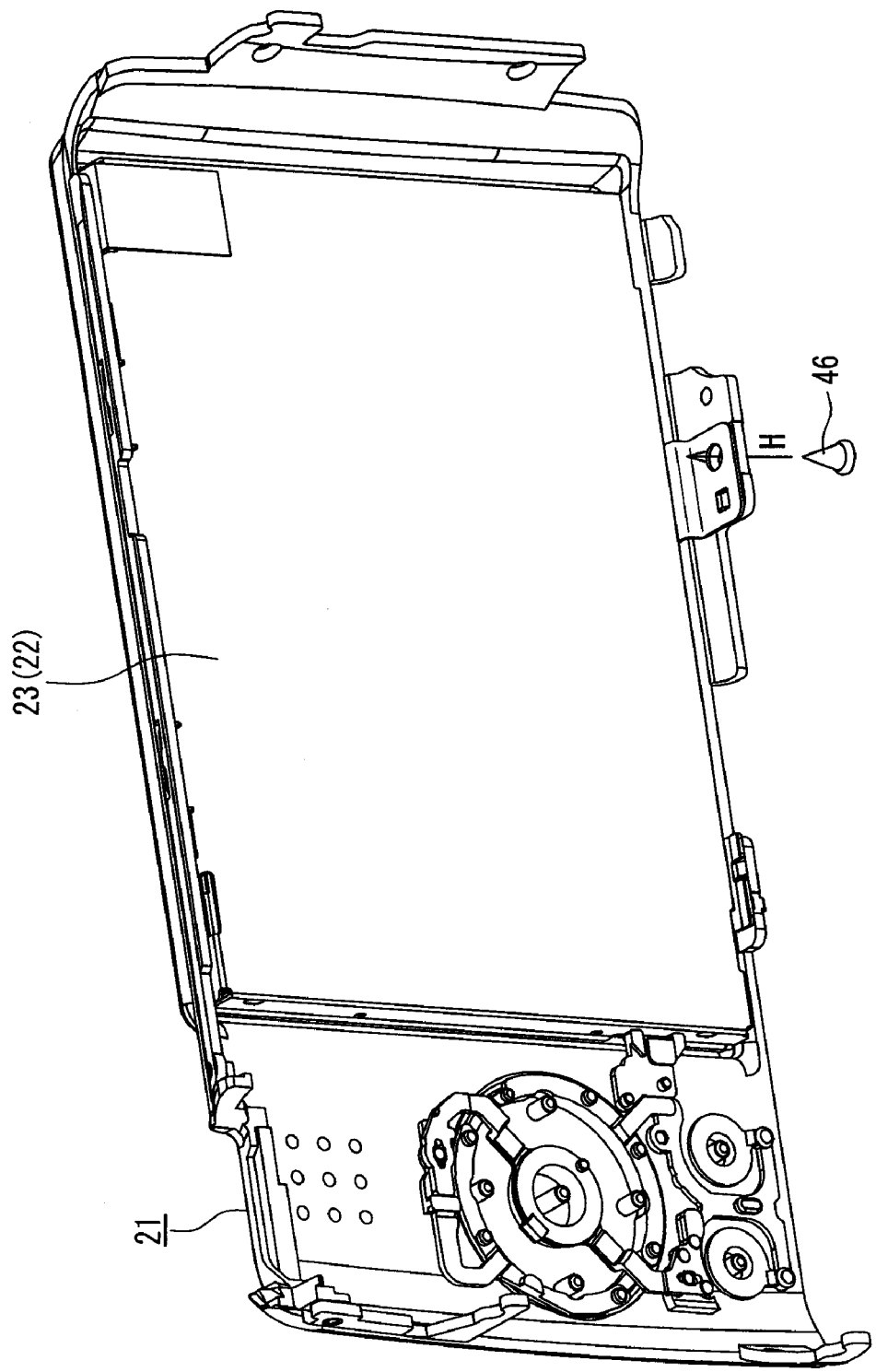
FIG. 14 is a perspective view of the rear unit with the holding frame and the display unit mounted thereon.

Consequently, as shown in FIG. 13, the holding frame 23 can be attached (fixed provisionally) to the inner surface of the rear unit 21. FIG. 14 is a perspective view showing the state in which the holding frame 23 is attached (fixed provisionally) to the inner surface of the rear unit 21.

Furthermore, in the state shown in FIG. 13, since the elastic chip 23c is engaged with the projection 21c with elastic deformation, the holding frame 23 can be attached to the rear unit 21 with looseness suppressed. Furthermore, since the projection 21c is fitted in the concave portion 23n, the holding frame 23 can be positioned with respect to the rear unit 21.

[3-3. Method of Attaching the Rear Unit 21 to the Front Unit 24]

Figure 15:
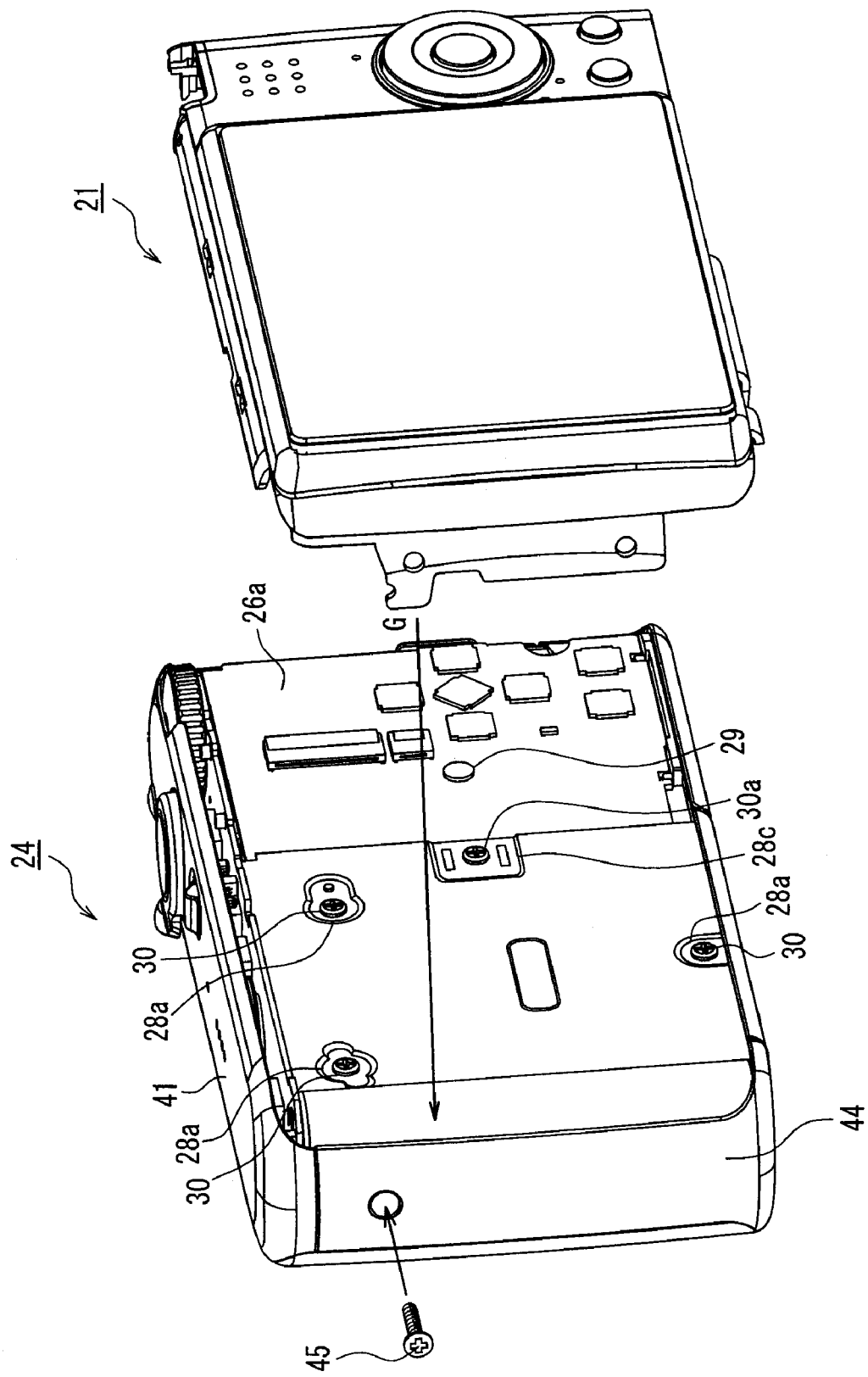
FIG. 15 is a perspective view illustrating an operation in which the rear unit is mounted on the front unit.
Figure 16:
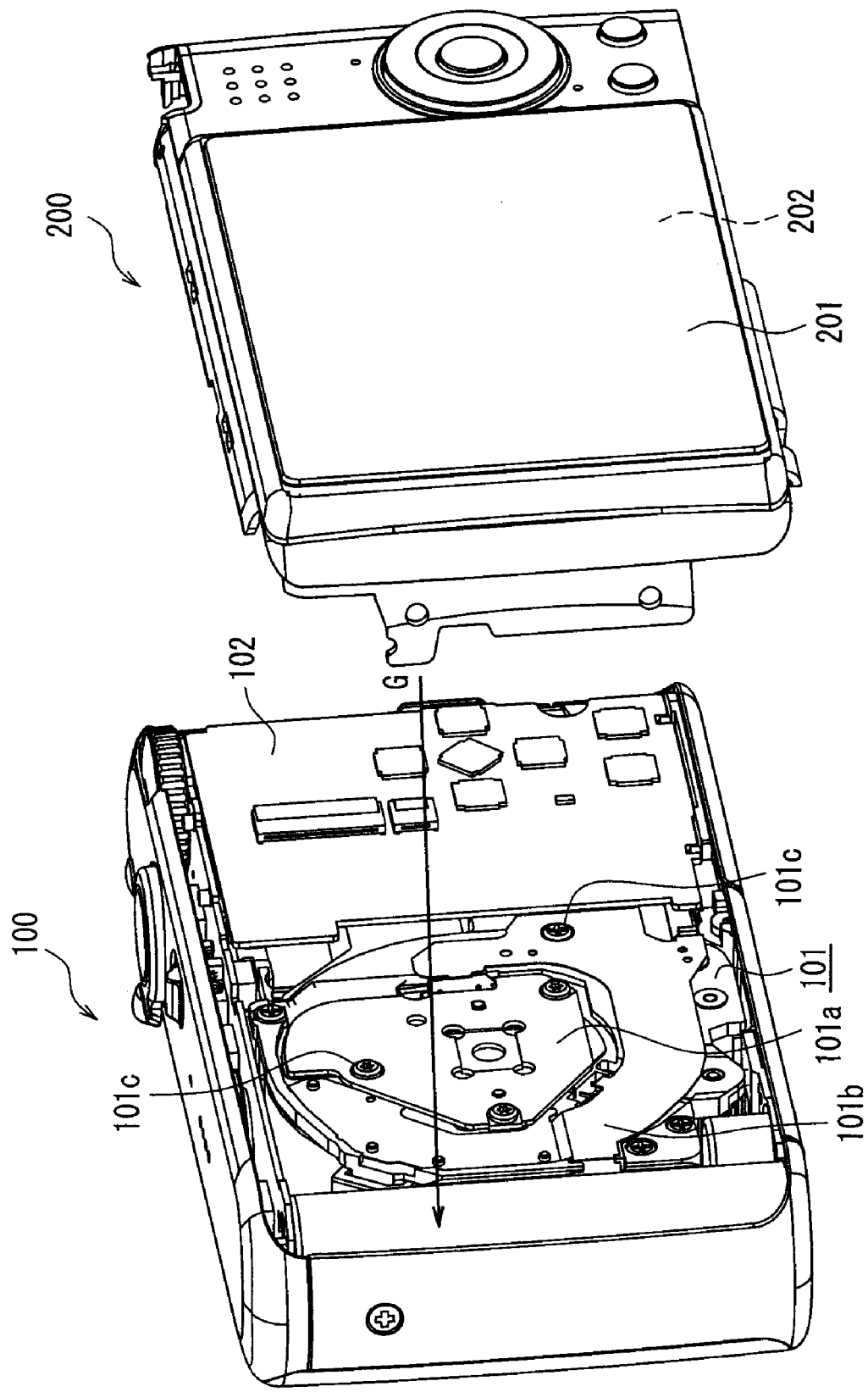
FIG. 16 is a perspective view illustrating an operation in which a rear unit is mounted on a front unit in a conventional image pickup apparatus.

First, the upper cover 41 is attached to a frame (not shown) holding the camera unit 25 and the electric circuit unit 26. Next, the front cover 42 (see FIG. 1) is attached to the frame, whereby the front unit 24 shown in FIG. 15 is completed. Although the side cover 44 is drawn so as to be attached to the front unit 24 shown in FIG. 15 for convenience, the side cover 44 actually is attached to the front unit 24 after the rear unit 21 is attached to the front unit 24 (described in detail later).

Next, as shown in FIG. 15, the rear unit 21 is attached to the front unit 24 as represented by an arrow G. At this time, as described with reference to FIG. 10, the rear surface of the display panel 22 is opposed to the protection plate 28 with a minute gap. Furthermore, a part of the rear surface of the display panel 22 is opposed to the printed board 26a. Furthermore, the vicinity of the injection port 22k of the display panel is opposed to the projection 29 with a minute gap.

Next, the side covers 44 are attached to both side surfaces of the image pickup apparatus. The side covers 44 are placed so as to cover not only the side surfaces of the image pickup apparatus but also a part of the bottom surface thereof.

Next, the screw 45 is inserted through a hole formed in the side cover 44, whereby the side cover 44 is fastened to the front unit 4. At this time, the upper cover 41, the rear unit 21, and the side covers 44 are fastened to be fixed together to the front unit 24 with the screw 45.

Furthermore, a screw 46 (see FIG. 14) is tightened from the bottom surface side of the image pickup apparatus. That is, a female screw (not shown) is formed on the bottom surface of the front unit 24, and the screw 46 is screwed in the female screw. At this time, as shown in FIG. 14, the screw 46 is screwed in the front unit 24 through the opening of the rear unit 21 and the holding frame 23, so that the rear unit 21 and the holding frame 23 are fastened together to be fixed to the front unit 24.

At this time, the engagement hole 21b formed in the upper surface of the rear unit 21 and the positioning chip 23b engaged with the engagement hole 21b are covered with the upper cover 41, so that they are not apparent visually from the outside.

[4. Effects of the Embodiment, etc.]

According to the present embodiment, the protection plate 28 in a plate shape is placed on the surface of the lens frame 25a of the image pickup portion 25, whereby the display panel 22 can be suppressed from being deformed when an external pressure or external impact is applied (e.g., at a position and in a direction represented by the arrow M in FIG. 10C) to the display panel 22, and the display panel 22 can be prevented from being damaged.

In the present embodiment, the use of the protection plate 28 in a plate shape can suppress the deformation of the display panel 22 even if an external pressure or external impact is applied to any place in the display area 22a of the display panel 22, whereby the display panel 22 can be prevented from being damaged.

Furthermore, due to the presence of the projection 29, the display panel 22 can be suppressed from being deformed when an external pressure or external impact is applied (for example, at a position and in a direction represented by the arrow N in FIG. 10C) to a portion of the display panel 22 overlapping the printed board 26a, which can prevent the display panel 22 from being damaged.

Furthermore, the projection 29 is placed at a position overlapping the injection port 22k of the display panel 22, whereby the deformation of the display panel 22 can be suppressed when an external pressure or external impact is applied to a portion in which the strength is decreased due to the presence of the injection port 22k, and the display panel 22 can be prevented from being damaged.

Furthermore, the projection 29 is placed on the printed board 26a, whereby the deformation of the printed board 26a can be prevented when an external pressure or external impact is applied (for example, at a position and in a direction represented by the arrow N in FIG. 10C) to the display panel 22. More specifically, in the case where the projection 29 is not formed, the display panel 22 deformed by an external pressure or external impact presses the printed board 26a to deform it, with the result that a soldered portion of an electric element mounted on the printed board 26a may be peeled. In particular, the recent image pickup apparatus mostly has a configuration in which a signal processing circuit is composed of a microcomputer chip, and hence, it takes much time and trouble for soldering again. Furthermore, when a microcomputer is subjected to ball grid array (BGA) mounting for high integration, since the soldered portion is present between the microcomputer and the printed board, it is very difficult to check visually whether or not the soldered portion is peeled. In contrast, according to the present embodiment, the projection 29 is provided so as to protrude on the printed board 29, whereby the display panel 22 can be prevented from abutting against the printed board 26a when the display panel 22 is deformed by an external pressure or external impact, which can prevent the printed board 26a from being deformed. Thus, the solder of various kinds of electric elements such as a microcomputer chip mounted on the printed board 26a can be prevented from being peeled.

Furthermore, due to the presence of the projection 29, the deformation of a portion of the display panel 22 opposed to the printed board 26a can be suppressed, whereby the protection plate 28 can be reduced in size to enlarge the mounting area of the printed board 26a. Thus, even if the microcomputer chip is enlarged due to the increase in functions and the number of microcomputer chips increases, the image pickup apparatus does not need to be enlarged.

Furthermore, the protection plate 28 and the battery mounting portion 26b made of metal are fastened with a screw, and the battery mounting portion 26b and the side covers 44 made of metal are fastened with screws, whereby the protection plate 28 can be grounded via the battery mounting portion 26b and the side covers 44, and unwanted radiation and charging with static electricity can be prevented.

Furthermore, the protection plate 28 is provided, and the inner diameter of the hole 25b of the lens frame 25a and the inner diameter of the hole 28b of the protection plate 28 are set to be sufficiently larger than the outer diameter of the male screw portion of the screw 30, whereby the tightening torque of the screw 30 can be prevented from being transmitted to the lens frame 25a (lens unit) directly when the lens frame 25a (lens unit) is fastened to be fixed to the frame 31 with the screw 30. Thus, the lens frame 25a can be fixed to the frame 31 without distortion.

Furthermore, the flexible printed board (wiring member) placed on the surface of the lens frame 25a can be prevented from coming into contact with the rear surface of the display unit 22, and display nonuniformity can be prevented from occurring in an image displayed on the display area 22a of the display unit 22.

As the electronic equipment of the present embodiment, the image pickup apparatus has been illustrated as an example; however, the present invention may be electronic equipment with at least a display element such as a liquid crystal display panel mounted thereon. Examples of the electronic equipment include a mobile telephone, a personal digital assistant (PDA), and a game machine of a palm size, as well as an image pickup apparatus such as a digital still camera.

Furthermore, as in the positioning chips 23b, the elastic chip 23c, and the like shown in FIG. 6, structures (folded portions) bent from the upper wall 23x and the lower wall 23y are formed over an entire region of the upper wall 23x, the lower wall 23y, and a pair of side walls 23z, whereby the strength of the upper wall 23x, the lower wall 23y, and the pair of side walls 23z can be enhanced. In particular, the strength can be enhanced with respect to an external pressure or external impact applied to the display area 22a of the display panel 22 in a perpendicular direction. Furthermore, the above folded portions are formed at least in the vicinity of the injection port 22k of the display panel 22, instead of the entire region of the upper wall 23x, the lower wall 23y, and a pair of side walls 23z, whereby the display panel 22 can be prevented from being deformed even when an external pressure or external impact is applied to the vicinity of the injection port 22k having small strength.

Furthermore, although the protection plate 28 is fixed at three points with the screws 30, the number of fixed points is arbitrarily selected and depends upon the number of fixed points in the fixing between the lens frame 25a and the frame 31.

Furthermore, the position of the projection 29 is not limited to that shown in FIGS. 10A and 10B, and the projection 29 is placed at least at a position corresponding to the injection port 22k of the display panel 22, whereby similar effects can be obtained.

Furthermore, the display panel 22 is not limited to a liquid crystal display panel, and may be composed of a display element such as an organic EL display panel and a plasma display panel. In the case where the display panel 22 is composed of an organic EL display panel and a plasma display panel, a liquid crystal injection port is not formed unlike a liquid crystal display panel. Therefore, the projection 29 can be formed at any position as long as it can abut against at least a part of a display element to suppress the deformation of the display element with respect to an external pressure or external impact.

The electronic equipment of the present invention is useful for equipment provided with a display element. Furthermore, the electronic equipment of the present invention is useful for an image pickup apparatus provided with a display element.

[Note 1]

Electronic equipment of the present invention includes a display panel, and further includes a protection plate that is opposed to an opposite surface of a display surface of the display panel and that is substantially parallel to the opposite surface of the display surface of the display panel.

According to the above configuration, when an external pressure or external impact is applied to the display element, the deformation of the display element can be prevented, and the strength with respect to the external pressure or external impact can be enhanced.

The display unit 22 is an example of the display panel. The electric circuit unit 26 is an example of the electric circuit board. The protection plate 28 is an example of the protection plate.

[Note 2]

The electronic equipment of the present invention further includes a support portion opposed to the opposite surface of the display surface of the display panel, wherein the protection plate is smaller than the display panel, and a tip end of the support portion is placed on a plane substantially identical to that of the protection plate.

According to the above configuration, even when the protection plate is smaller than the display panel, the support portion supports a part of the display panel to suppress the deformation caused by an external pressure or external impact.

The projection 29 is an example of the support portion.

[Note 3]

The electronic equipment of the present invention further includes an electric circuit board opposed to the opposite surface of the display surface of the display panel, wherein the support portion is placed so as to protrude from the electric circuit substrate side to the display panel side.

According to the above configuration, even when the display panel is deformed by an external pressure or external impact, the support portion can suppress the display panel from being deformed. Thus, the deformation of the electric circuit board can be prevented, and the disconnection and damage of the electronic components mounted on the electric circuit board can be prevented.

[Note 4]

In the electronic equipment of the present invention, the display panel is composed of a liquid crystal display panel, and the support portion is placed in a vicinity of a site opposed to a liquid crystal injection port of the liquid crystal display panel.

According to the above configuration, when an external pressure or external impact is applied to the vicinity of the liquid crystal injection port having a strength lower than that of other sites, the liquid crystal panel can be prevented from being deformed and damaged.

[Note 5]

The electronic equipment of the present invention further includes two electric circuit substrates, and the support portion can be formed integrally with a spacer for forming a gap of a predetermined size between the two electric circuit substrates.

According to the above configuration, a component count can be reduced, and the support portion and the spacer can be formed simultaneously, which can reduce a production man-hour.

[Note 6]

In the electronic equipment of the present invention, the protection plate is made of a conductive material, and can be fastened to be fixed to a housing made of a conductive material with a screw made of a conductive material.

According to the above configuration, the protection plate can be grounded electrically with respect to the housing, and unwanted radiation performance in the image pick up portion can be enhanced, and the charging of static electricity in the protection plate can be prevented.

[Note 7]

Furthermore, an image pickup apparatus of the present invention includes an image pickup portion and a display panel, and further includes a protection plate that is placed between the image pickup portion and the display panel, that is opposed to the opposite surface of the display surface of the display panel, and that is substantially parallel to the opposite surface of the display surface of the display panel.

According to the above configuration, when the image pick up apparatus is assembled, the rotation torque of a screw that fastens a lens is unlikely to be transmitted to a lens flame, so that the lens is not distorted. The wiring member of the lens can be prevented from abutting against the rear surface of the display panel, so that display nonuniformity can be prevented from occurring in the display panel.

The camera unit 25 is an example of the image pickup portion. The display unit 22 is an example of the display panel. The protection plate 28 is an example of the protective plate.

[Note 8]

The image pickup apparatus of the present invention further includes a frame that fastens and fixes the image pickup portion to the protection plate with a screw, wherein an inner diameter of a hole of the image pick up portion with respect to the screw and an inner diameter of the hole of the protection plate with respect to the screw are set to be larger than an outer diameter of a male screw portion of the screw.

According to the above configuration, when the protection plate and the image pickup portion are fastened to be fixed to the frame with a screw, the tightening torque of the screw can be prevented from being transmitted to the image pickup portion directly. This can prevent the distortion of the image pickup portion, whereby optical precision in the image pickup portion can be maintained. Furthermore, the wiring member of the lens can be prevented from abutting against the rear surface of the display panel, whereby display nonuniformity of the display panel can be prevented.

The hole 25b is an example of the hole formed in the image pickup portion (camera unit 25). The hole 28b is an example of the hole formed in the protection plate (protection plate 28). The frame 31 is an example of the frame.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. Electronic equipment having a display panel, comprising: a protection plate that is opposed to an opposite surface of a display surface of the display panel and is substantially parallel to the opposite surface of the display surface of the display panel; and
    a support portion opposed to the opposite surface of the display surface of the display panel,
    wherein the protection plate is smaller than the display panel, and
    a tip end of the support portion is placed on a plane substantially identical to that of the protection date.

2. The electronic equipment according to claim 1, further comprising an electric circuit board opposed to the opposite surface of the display surface of the display panel,
    wherein the support portion is placed so as to protrude from the electric circuit substrate side to the display panel side.

3. The electronic equipment according to claim 1, wherein the display panel is composed of a liquid crystal display panel, and the support portion is placed in a vicinity of a site opposed to a liquid crystal injection port of the liquid crystal display panel.

4. The electronic equipment according to claim 1, further comprising two electric circuit substrates,
    wherein the support portion is formed integrally with a spacer for forming a gap of a predetermined size between the two electric circuit substrates.

5. The electronic equipment according to claim 1, wherein the protection plate is made of a conductive material, and is fastened to be fixed to a housing made of a conductive material with a screw made of a conductive material.

6. An image pickup apparatus having an image pickup portion and a display panel, comprising a protection plate that is placed between the image pickup portion and the display panel, that is opposed to the opposite surface of the display surface of the display panel, and that is substantially parallel to the opposite surface of the display surface of the display panel; and a support portion opposed to the opposite surface of the display surface of the display panel, wherein the protection plate is smaller than the display panel, and a tip end of the support portion is placed on a plane substantially identical to that of the protection plate.

7. The image pickup apparatus according to claim 6, further comprising a frame that fastens and fixes the image pickup portion to the protection plate with a screw, wherein an inner diameter of a hole of the image pick up portion with respect to the screw and an inner diameter of the hole of the protection plate with respect to the screw arc set to be larger than an outer diameter of a male screw portion of the screw.

* * * * *